US012602858B2

(12) United States Patent
Xie et al.

(10) Patent No.: US 12,602,858 B2
(45) Date of Patent: Apr. 14, 2026

(54) RENDERING METHOD AND APPARATUS, AND DEVICE

(71) Applicant: Huawei Cloud Computing Technologies Co., Ltd., Guizhou (CN)

(72) Inventors: Kun Xie, Shenzhen (CN); Qing Yin, Xi'an (CN)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 89 days.

(21) Appl. No.: 18/189,677

(22) Filed: Mar. 24, 2023

(65) Prior Publication Data

US 2023/0230311 A1 Jul. 20, 2023

Related U.S. Application Data

(63) Continuation of application No. PCT/CN2021/120584, filed on Sep. 26, 2021.

(30) Foreign Application Priority Data

Sep. 25, 2020 (CN) .......................... 202011023679.8
Jan. 21, 2021 (CN) .......................... 202110080547.7

(51) Int. Cl.
*G06T 15/06* (2011.01)
*G06T 17/20* (2006.01)

(52) U.S. Cl.
CPC .............. *G06T 15/06* (2013.01); *G06T 17/20* (2013.01)

(58) Field of Classification Search
CPC .......... G06T 15/06; G06T 17/20; G06T 13/20
See application file for complete search history.

(56) References Cited

U.S. PATENT DOCUMENTS 6,573,890 B1 * 6/2003 Lengyel .................. G06T 17/20
345/418
2008/0024495 A1 1/2008 Mech et al.
2010/0265250 A1 10/2010 Koenig et al.
(Continued)

FOREIGN PATENT DOCUMENTS

CN 106127843 A 11/2016
CN 111275803 A 6/2020
(Continued)

OTHER PUBLICATIONS

Zhao Kai Yuan "Real-Time Ambient Occlusion Based on RTX," Superstar Journal, Dec. 2019, with English translation, 14 pages.
(Continued)

*Primary Examiner* — Antonio A Caschera
(74) *Attorney, Agent, or Firm* — Conley Rose, P.C.

(57) ABSTRACT

In a rendering method, a target mesh corresponding to a pixel in a current viewplane is determined in a process of rendering a current frame of the application, a historical rendering result of the target mesh that is obtained in a process of rendering a historical frame of the application is obtained, and a current rendering result of the pixel is calculated based on the historical rendering result of the target mesh. According to the rendering method, the current rendering result is calculated by reusing the historical rendering result.

20 Claims, 14 Drawing Sheets

(56) References Cited

U.S. PATENT DOCUMENTS

| | | | |
|---|---|---|---|
| 2015/0221069 A1* | 8/2015 | Shaburova | G06T 7/246 |
| | | | 382/167 |
| 2018/0096516 A1* | 4/2018 | Luebke | G06T 15/06 |
| 2021/0383617 A1* | 12/2021 | Sugano | H04N 21/8153 |
| 2022/0254093 A1 | 8/2022 | Zheng et al. | |

FOREIGN PATENT DOCUMENTS

| | | |
|---|---|---|
| CN | 111340928 A | 6/2020 |
| CN | 111627116 A | 9/2020 |

OTHER PUBLICATIONS

Christopher A Burns et al, "The Visibility Buffer: A Cache-Friendly Approach to Deferred Shading," Journal of Computer Graphics Techniques, vol. 2, No. 12, 2013, XP055358853, 15 pages.
Ingo Wald et al, "State of the Art in Ray Tracing Animated Scenes," Computer Graphics Forum : Journal of the European Association for Computer Graphics, Wiley-Blackwell, Oxford, vol. 28, No. 6, XP071487632, Apr. 24, 2009, 32 pages.
Daniel Scherzer et al, "Temporal Coherence Methods in Real-Time Rendering," Computer Graphics Forum : Journal of the European Association for Computer Graphics, Wiley-Blackwell, Oxford, vol. 31, No. 8, XP071487832, Sep. 4, 2012, 31 pages.

* cited by examiner

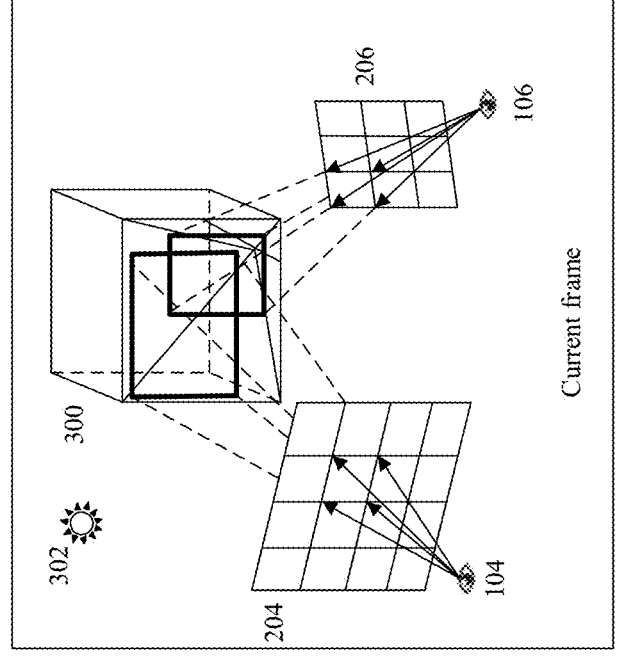
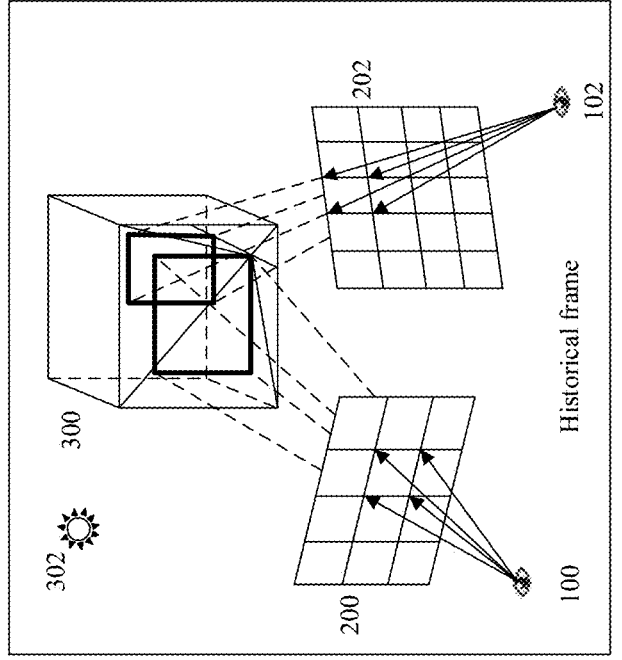
FIG. 4

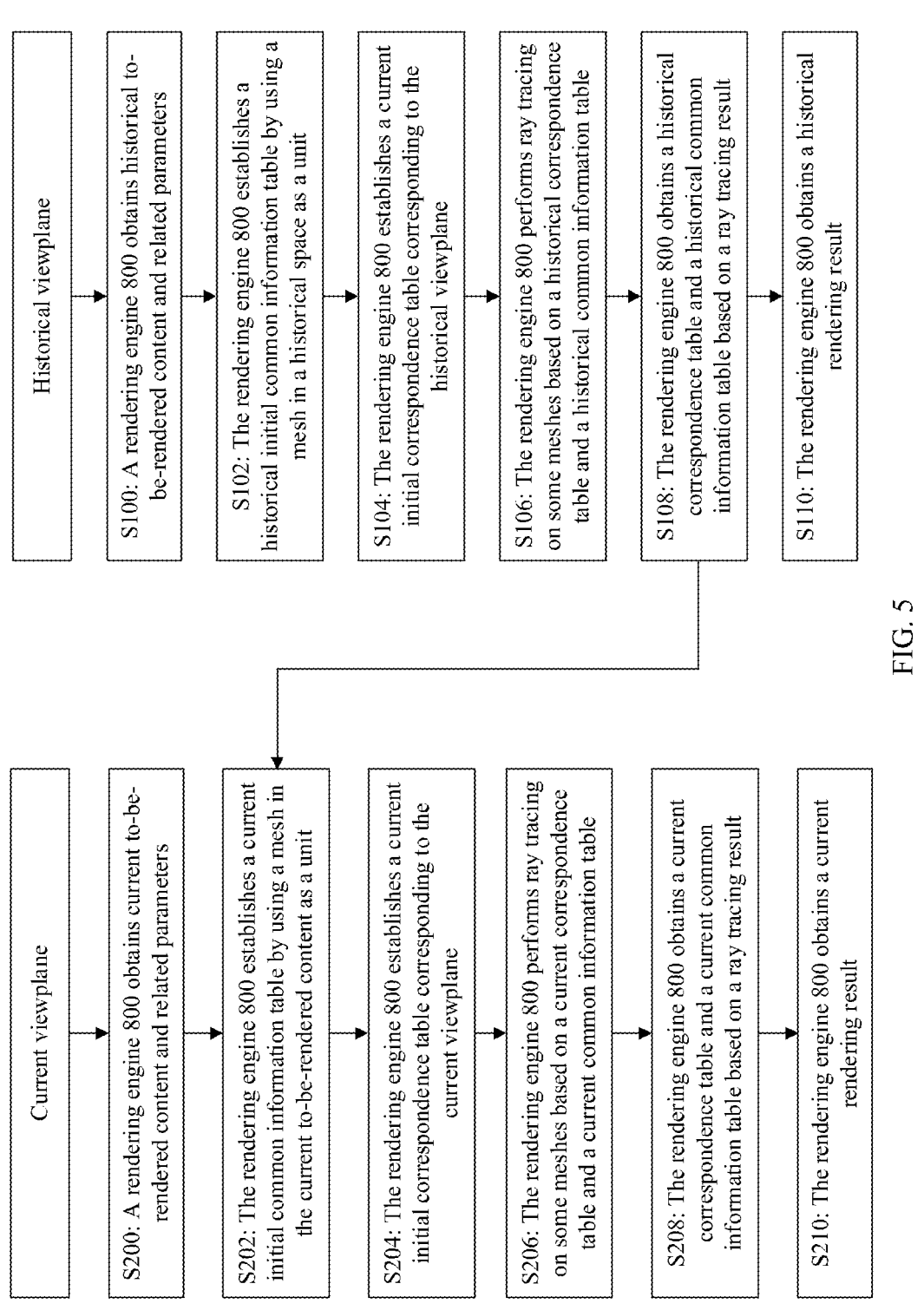

Historical viewplane

S100: A rendering engine 800 obtains historical to-be-rendered content and related parameters S102: The rendering engine 800 establishes a historical initial common information table by using a mesh in a historical space as a unit S104: The rendering engine 800 establishes a current initial correspondence table corresponding to the historical viewplane S106: The rendering engine 800 performs ray tracing on some meshes based on a historical correspondence table and a historical common information table S108: The rendering engine 800 obtains a historical correspondence table and a historical common information table based on a ray tracing result S110: The rendering engine 800 obtains a historical rendering result Current viewplane S200: A rendering engine 800 obtains current to-be-rendered content and related parameters S202: The rendering engine 800 establishes a current initial common information table by using a mesh in the current to-be-rendered content as a unit S204: The rendering engine 800 establishes a current initial correspondence table corresponding to the current viewplane S206: The rendering engine 800 performs ray tracing on some meshes based on a current correspondence table and a current common information table S208: The rendering engine 800 obtains a current correspondence table and a current common information table based on a ray tracing result S210: The rendering engine 800 obtains a current rendering result

FIG. 5

| Mesh number | Sample value | Rendering result | Material |
|---|---|---|---|
| 1 | S1 | C1 | M1 |
| 2 | S2 | C2 | M2 |
| ... | ... | ... | ... |
| m | Sm | Cm | Mm |
| ... | ... | ... | ... |
| p | Sp | Cp | Mp |

FIG. 6

| Pixel number | Mesh number | Mesh depth value | Rendering result of a visible mesh | Pixel rendering result |
|---|---|---|---|---|
| 1 | 1, 2, 6 | D1, D2, D6 | 0, 0, 0 | 0 |
| 2 | 1, 3, 4 | D1, D3, D4 | 0, 0, 0 | 0 |
| ... | ... | ... | ... | ... |
| n | m | Dm | 0 | 0 |

FIG. 7

| Mesh number | Sample value | Rendering result | Material |
|---|---|---|---|
| 1 | S1 | C1 | M1 |
| 2 | S2' | C2' | M2 |
| ... | ... | ... | ... |
| m | Sm' | Cm' | Mm |
| ... | ... | ... | ... |
| p | Sp | Cp | Mp |

FIG. 8

| Pixel number | Mesh number | Mesh depth value | Rendering result of a visible mesh | Pixel rendering result |
|---|---|---|---|---|
| 1 | 1, 2, 6 | D1, D2, D6 | C1, C2' | P1 |
| 2 | 1, 3, 4 | D1, D3, D4 | C1, C3', C4' | P2 |
| ... | ... | ... | ... | ... |
| n | m | Dm | Cm' | Pn |

FIG. 9

| Visible mesh number | Viewplane number | Rendering result corresponding to each viewplane | Updated rendering result of a visible mesh |
|---|---|---|---|
| 1 | Z2, Z3, Z9 | C1-2, C1-3, C1-9 | C1' |
| 2 | Z2, Z6 | C2-2, C2-6 | C2" |
| ... | ... | ... | ... |
| n | Z14, Zm | Cn-14, Cn-m | Pn" |

| Pixel number | Mesh number | Mesh depth value | Rendering result of a visible mesh | Pixel rendering result |
|---|---|---|---|---|
| 1 | 1, 2, 6 | D1, D2, D6 | C1', C2" | P1' |
| 2 | 1, 3, 4 | D1, D3, D4 | C1', C3", C4' | P2' |
| ... | ... | ... | ... | ... |
| n | m | Dm | Cm" | Pn" |

RENDERING METHOD AND APPARATUS, AND DEVICE

CROSS-REFERENCE TO RELATED APPLICATIONS

This is a continuation of International Patent Application No. PCT/CN2021/120584 filed on Sep. 26, 2021, which claims priority to Chinese Patent Application No. 202110080547.7 filed on Jan. 21, 2021, and Chinese Patent Application No. 202011023679.8 filed on Sep. 25, 2020. All of the aforementioned patent applications are hereby incorporated by reference in their entireties.

TECHNICAL FIELD

This disclosure relates to the field of graphics rendering, and in particular, to a rendering method and apparatus, and a device.

BACKGROUND

Ray tracing-based rendering technology is a basic technology in the field of computer graphics. So far, this technology is the most important technology to achieve high-quality, realistic, and high-definition images. However, this technology requires a long calculation time to complete a process of calculating a large quantity of Monte Carlo integrals and generate a final calculation result. Therefore, this technology has always been applied to offline rendering scenarios, such as video, animation, and other fields. With advance of computing power of computer hardware, in recent years, a requirement for a ray tracing-based rendering technology becomes increasingly strong due to emergence of some rendering service fields (games and virtual reality) that have a relatively strong requirement for real-time performance.

For the ray tracing-based rendering technology, how to implement real-time graphics rendering has become a major concern in the industry.

SUMMARY

This disclosure provides a rendering method, which can improve rendering efficiency.

A first aspect of this disclosure provides a rendering method, where rendering method is used for rendering an application, the application includes at least one model, and each model includes a plurality of meshes. The method includes: determining, in a process of rendering a current frame of the application, a target mesh corresponding to a pixel in a current viewplane corresponding to the current frame, where the target mesh is included in the plurality of meshes; obtaining a historical rendering result of the target mesh that is obtained in a process of rendering a historical frame of the application; and calculating a current rendering result of the pixel based on the historical rendering result of the target mesh.

According to the rendering method, a quantity of traced rays is reduced by reusing the historical rendering result of the target mesh when ray tracing-based rendering is performed on the target mesh in a current frame, thereby effectively improving efficiency of ray tracing-based rendering.

In some possible designs, the method further includes: in a process of rendering the current frame, the rendering method calculates a current rendering result corresponding to the target mesh in the current frame by obtaining a historical rendering result corresponding to the target mesh in the historical frame. Further, a current rendering result of a pixel in the current viewplane is calculated based on the current rendering result of the target mesh. Subsequently, the foregoing method is performed on each pixel of the viewplane to obtain a rendering result of the viewplane, that is, obtain the current frame.

In some possible designs, the method further includes: performing ray tracing-based rendering on the target mesh to obtain an intermediate rendering result of the target mesh; and the calculating a current rendering result of the pixel based on the historical rendering result of the target mesh includes: calculating a current rendering result of the target mesh based on the historical rendering result of the target mesh and the intermediate rendering result of the target mesh; and calculating the current rendering result of the pixel based on the current rendering result of the target mesh.

According to the rendering method, after ray tracing is performed on the target mesh, an intermediate rendering result of the target mesh is used to improve a current rendering result of the target mesh. When a quantity of traced rays emitted by the target mesh remains unchanged, the rendering result of the target mesh is improved, and efficiency of ray tracing-based rendering is effectively improved.

The step of performing ray tracing-based rendering on the target mesh to obtain an intermediate rendering result of the target mesh may occur before or after the historical rendering result of the mesh is obtained. Optionally, this step may also occur at the same time as the step of obtaining the historical rendering result of the mesh.

In some possible designs, the method further includes: determining that a sample quantity corresponding to the historical rendering result of the target mesh is greater than a threshold; and the calculating a current rendering result of the pixel based on the historical rendering result of the target mesh includes: using the historical rendering result of the target mesh as a current rendering result of the target mesh, where the current rendering result of the target mesh is used to calculate the current rendering result of the pixel.

For the target mesh with the historical rendering result corresponding to a sample quantity greater than the threshold, the historical rendering result of the target mesh is directly used as the current rendering result of the target mesh. This may avoid performing ray tracing-based rendering on the target mesh, and the historical rendering result of the mesh is directly reused, thereby effectively improving overall rendering efficiency of the current viewplane.

In some possible designs, the method further includes: determining that a sample quantity corresponding to the historical rendering result of the target mesh is not greater than a threshold; and the calculating a current rendering result of the pixel based on the historical rendering result of the target mesh includes: performing ray tracing-based rendering on the target mesh to obtain an intermediate rendering result of the target mesh; calculating a current rendering result of the target mesh based on the intermediate rendering result of the target mesh and the historical rendering result of the target mesh; and calculating the rendering result of the pixel based on the current rendering result of the target mesh.

For the target mesh whose sample quantity corresponding to the historical rendering result is not greater than the threshold, while ray tracing-based rendering is performed on the target mesh, the historical rendering result of the target mesh is reused, so that a quantity of traced rays emitted from the target mesh may be reduced, thereby effectively improving overall rendering efficiency of the current viewplane.

In a process of calculating the current rendering result of the target mesh, a process rendering result of the target mesh obtained is the intermediate rendering result of the target mesh. Generally, ray tracing-based rendering may be performed on the target mesh to obtain the intermediate rendering result of the target mesh. A quantity of traced rays for the ray tracing-based rendering is less than a threshold.

In some possible designs, the method further includes: storing the current rendering result of the target mesh. The current rendering result of the target mesh may be stored in a memory, so that the current rendering result of the target mesh is reused in a rendering process of a subsequent frame. A historical rendering result that may be reused is provided for the current rendering result of the target mesh in the subsequent frame, so that rendering efficiency of the target mesh in the subsequent frame may be effectively improved.

In some possible designs, the current viewplane is generated in a first application, and the historical rendering result of the target mesh is generated in a second application.

In some possible designs, the historical rendering result of the target mesh and the current viewplane are generated in a same application.

In some possible designs, the historical rendering result of the target mesh is obtained based on ray tracing-based rendering.

A second aspect of this disclosure provides a rendering engine, where the apparatus includes a processing unit and a storage unit. The processing unit is configured to: determine, in a process of rendering a current frame of an application, a target mesh corresponding to a pixel in a current viewplane; obtain a historical rendering result of the target mesh that is obtained in a process of rendering a historical frame of the application; and calculate a current rendering result of the pixel based on the historical rendering result of the target mesh, where the application includes at least one model, and each model includes a plurality of meshes. The storage unit is configured to store the historical rendering result of the target mesh that is obtained in the process of rendering the historical frame of the application.

In some possible designs, the processing unit is further configured to: before calculating the current rendering result of the pixel based on the historical rendering result of the target mesh, perform ray tracing-based rendering on the target mesh to obtain an intermediate rendering result of the target mesh; determine a current rendering result of the target mesh based on the historical rendering result of the target mesh and the intermediate rendering result of the target mesh; and determine the current rendering result of the pixel based on the current rendering result of the target mesh.

In some possible designs, the processing unit is further configured to: determine that a sample quantity corresponding to the historical rendering result of the target mesh is greater than a threshold; and use the historical rendering result of the mesh as a current rendering result of the mesh, where the current rendering result of the mesh is used to determine the current rendering result of the pixel.

In some possible designs, the processing unit is further configured to: determine that a sample quantity corresponding to the historical rendering result of the target mesh is not greater than a threshold; perform ray tracing-based rendering on the target mesh to obtain an intermediate rendering result of the target mesh; determine a current rendering result of the target mesh based on the intermediate rendering result of the target mesh based on the intermediate rendering result of the target mesh and the historical rendering result of the target mesh; and determine the rendering result of the pixel based on the current rendering result of the target mesh.

In some possible designs, the storage unit is configured to store the current rendering result of the target mesh.

A third aspect of this disclosure provides a computer program product including instructions, where when the instructions are run by a computer device cluster, the computer device cluster is enabled to perform the method provided in the first aspect or any possible design of the first aspect.

A fourth aspect of this disclosure provides a computer-readable storage medium, including computer program instructions, where when the instructions are run by a computing device cluster, the computing device cluster is enabled to perform the method provided in the first aspect or any possible design of the first aspect.

A fifth aspect of this disclosure provides a computing device cluster, including at least one computing device, where each computing device includes a processor and a memory. The processor of the at least one computing device is configured to execute instructions stored in the memory of the at least one computing device, so that the computing device is enabled to perform the method provided in the first aspect or any possible design of the first aspect.

In some possible designs, the computing device cluster includes one computing device, and the computing device includes a processor and a memory. The processor is configured to execute instructions stored in the memory, to run the rendering engine provided in the method provided in the second aspect or any possible design of the second aspect, so that the computing device performs the method provided in the first aspect or any possible design of the first aspect.

In some possible designs, the computing device cluster includes at least two computing devices, and each computing device includes a processor and a memory. Processors of the at least two computing devices are configured to execute instructions stored in memories of the at least two computing devices, to run the rendering engine provided in the method provided in the second aspect or any possible design of the second aspect, so that the computing device cluster performs the method provided in the first aspect or any possible design of the first aspect. Each computing device runs some of the units included in the rendering engine.

BRIEF DESCRIPTION OF DRAWINGS

To describe the technical solutions in the embodiments of this disclosure more clearly, the following briefly describes the accompanying drawings for the embodiments.

FIG. 4 is a schematic diagram of a structure of a multi-viewpoint scenario according to an embodiment of this disclosure.

FIG. 5 is a flowchart of a rendering method according to an embodiment of this disclosure.

FIG. 6 shows a current initial common information table according to an embodiment of this disclosure.

FIG. 7 shows a current initial correspondence table according to an embodiment of this disclosure.

FIG. 8 shows a current common information table according to an embodiment of this disclosure.

FIG. 9 shows a current correspondence table according to an embodiment of this disclosure.

DESCRIPTION OF EMBODIMENTS

Figure 1A:
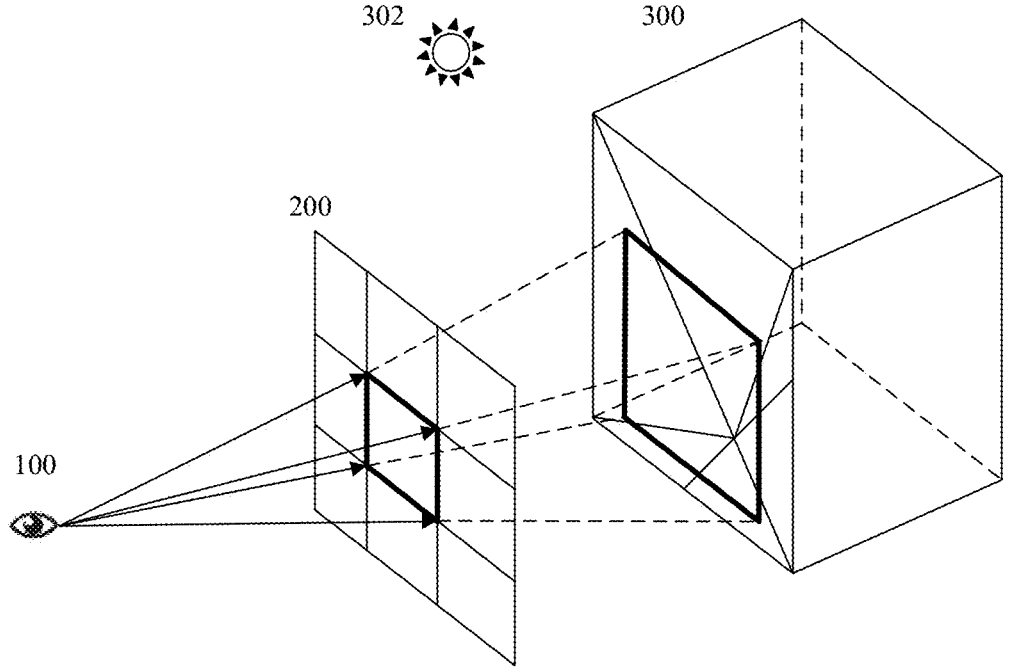
FIG. 1A is a schematic diagram of a rendering structure in a single viewpoint according to an embodiment of this disclosure.

The terms "first" and "second" in embodiments of this disclosure are merely used for descriptive purposes, and should not be construed as indicating or implying relative importance or implicitly indicating a quantity of indicated technical features. Therefore, a feature defined by "first" or "second" may explicitly or implicitly includes one or more such features.

Some technical terms used in embodiments of this disclosure are first described.

Mesh: A mesh is a smallest plane unit in a two-dimensional or three-dimensional space. Generally, in rendering, a model in a space needs to be divided into many tiny planes. These planes are also referred to as meshes, which may be arbitrary polygons, usually triangles and quadrilaterals. Intersection points of edges of these meshes are vertices of the meshes. A mesh may be obtained through random division based on information such as a material or a color of the model. In addition, each mesh has two opposite faces, and usually only one face can be seen. Therefore, in some cases, a back-face culling operation needs to be performed on the mesh.

Sample per mesh (SPM): SPM indicates a quantity of rays passing through each mesh. The mesh is a smallest unit in a three-dimensional space. Generally, a visible screen is made up of pixels arranged one by one, and each pixel corresponds to one or more meshes in the space. A color of a pixel is calculated based on a color (red, green, and blue (RGB)) of a mesh corresponding to the pixel. In ray tracing, a quantity of samples per mesh may affect a rendering result. A larger quantity of samples per mesh means that more rays from a viewpoint are cast on a model in the three-dimensional space. More rays that are cast on each mesh indicate a more accurate calculation of a rendering result of the mesh.

Rasterization: Rasterization is a process of converting three-dimensional (3D) graphics in a screen space into a raster image on a two-dimensional viewplane. A rasterization process includes: determining integer grid regions in window coordinates that are occupied by basic graphic elements, and assigning a rendering result and a depth value to each region. A mathematical representation of a model and color information related to the model are converted into pixels used for corresponding positions on the screen and colors used for filling the pixels. This process is referred to as rasterization.

Ray tracing: Ray tracing comes from a general technology of geometric optics in which rays that interact with an optical surface are traced to obtain a model of a path of the rays. Ray tracing is used in design of an optical system, such as a camera lens, a microscope, a telescope, and a binocular. When ray tracing is used for rendering, rays emitted from an eye rather than rays emitted from a light source are traced, and a mathematical model of an orchestrated scenario is generated and displayed by such a technology. A result obtained in such a way is similar to that of a ray casting or scanline rendering method, but this method has a better optical effect. For example, a simulation effect for reflection and refraction is more accurate, and efficiency is very high. Therefore, this method is often used when pursuing such a high-quality result. In a ray tracing method, a propagation distance, a propagation direction, and a new arrival position of a ray in a medium are first calculated before the ray is absorbed by the medium or before the direction of the ray is changed. Then, a new ray is generated from this new position. The same processing method is used to finally calculate a complete propagation path of the ray in the medium. Because the algorithm is a complete simulation of an imaging system, a complex picture can be generated by simulation.

With improvement of computer computing power and development of the industry, graphics rendering gradually becomes a focus of the industry. Currently, graphics rendering technologies mainly include rasterization and ray tracing.

For photorealistic implementations of illumination, rasterization may be completed through calculation by ray casting. However, for additional visual effects, such as soft shadows, global illumination, and caustics, data modeling and other methods are required for processing. For example, global illumination needs to be fitted using methods such as light map and irradiance map, and soft shadows need to be fitted using shadow map. Such a development method is relatively complex, and a visual effect after fitting is not satisfactory. Although rasterized rendering technology can support multi-viewpoint simultaneous rendering, an implementation process requires additional angle change processing during a final field-of-view change, but accuracy is relatively poor. Therefore, the rendering technology used below is mainly ray tracing.

It should be noted that ray tracing mentioned herein indicates a type of method for obtaining a rendering result by simulating casting of a ray. Methods such as backward ray tracing, distributed ray tracing, and bidirectional path tracing may be included.

To make the technical solutions of this disclosure clearer and easier to understand, before the rendering method provided in this disclosure is described, a relationship between three basic concepts, namely, a mesh, a vertex, and a pixel in the rendering technology is first described.

FIG. 1A is a schematic diagram of a rendering structure in a single viewpoint. The rendering structure includes at least a virtual viewpoint 100, a virtual viewplane 200, a model 300, and a light source 302.

The virtual viewpoint 100 is one or more human eyes simulated in a space, and is used to perceive a three-dimensional structure. Each frame of image corresponds to one space. Depending on a quantity of viewpoints, the virtual viewpoint 100 may be classified into a monocular viewpoint, a binocular viewpoint, and a multiocular viewpoint. For the binocular viewpoint or the multiocular viewpoint, two or more images are obtained from two or more different viewpoints to reconstruct a 3D structure or depth information of a target model.

The virtual viewplane 200 is a simulated display screen in a space. Construction of the virtual viewplane 200 is mainly determined by two factors: a distance from the virtual viewpoint 100 to the virtual viewplane 200 and a screen resolution.

The distance from the virtual viewpoint 100 to the virtual viewplane 200 is a vertical distance from the virtual viewpoint 100 to the virtual viewplane 200. Further, the distance may be set as required.

The screen resolution is a quantity of pixels included in the virtual viewplane 200. In other words, the virtual viewplane 200 includes one or more pixels. For example, in FIG. 1A, the virtual viewplane 200 includes 9 pixels (3*3).

In some possible implementations, a result obtained by performing a rendering operation may be used for outputting. In one ray tracing, rendering results of all pixels in the virtual viewplane 200 jointly form one frame of image. That is, in one ray tracing, one virtual viewplane 200 corresponds to one frame of image.

What corresponds to the virtual viewplane is a display screen configured to output a final result on a client side. A screen resolution of the display screen is not necessarily equal to the screen resolution of the virtual viewplane.

When the screen resolution of the display screen is equal to that of the virtual viewplane 200, the rendering result on the virtual viewplane 200 may be output to the display screen at a ratio of 1:1.

When the screen resolution of the display screen is different from that of the virtual viewplane 200, the rendering result on the virtual viewplane 200 is output to the display screen at a specific ratio. Calculation of a specific ratio belongs to the conventional technology, and details are not described herein.

The space may include one or more models 300. Which models 300 may be included in the rendering result corresponding to the virtual viewplane 200 is determined by a relative position between the corresponding virtual viewpoint 100 and each model 300.

Before a rendering operation, a surface of a model usually needs to be divided into a plurality of meshes. Sizes and shapes of the meshes may be consistent or inconsistent. A mesh division method belongs to the conventional technology, and details are not described herein.

Figure 1B:
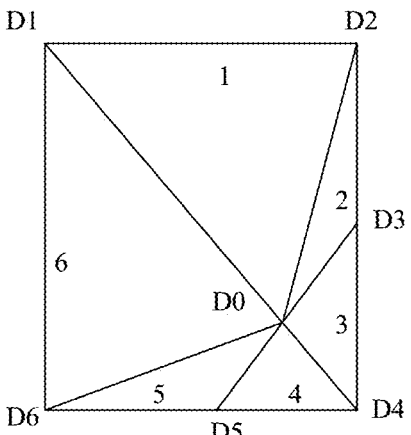
FIG. 1B is a schematic diagram of a mesh division according to an embodiment of this disclosure.

FIG. 1B shows a mesh division of one face of the model 300. As shown in FIG. 1B, one face of the model 300 is divided into six triangle meshes of different sizes.

All vertices in the space include not only intersection points (for example, D1, D2, D4, and D6) of the faces of the model 300, but also vertices (for example, D0, D3, and D5) of the meshes.

Figure 1C:
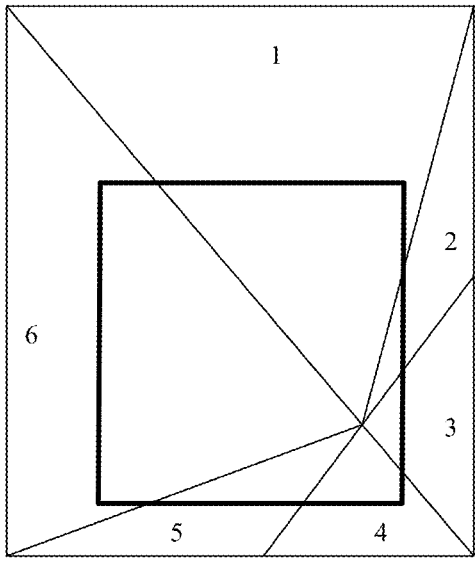
FIG. 1C is a schematic diagram of a correspondence between a pixel and a mesh according to an embodiment of this disclosure.

FIG. 1C is a schematic diagram of a correspondence between a pixel and a mesh. A bold box in FIG. 1C is a projection of a pixel in the virtual viewplane 200 in FIG. 1A on the model 300. It can be seen that the pixel projection region covers a part of a region of each of the meshes 1 to 6. The pixel projection region indicates a region enclosed by the projection of the pixel on the model.

One pixel projection region may cover a plurality of meshes, or may cover only one mesh. When one pixel projection region covers only one mesh, the pixel projection region may cover the entire region of the mesh, or may cover a part of the region of the mesh.

Figure 1D:
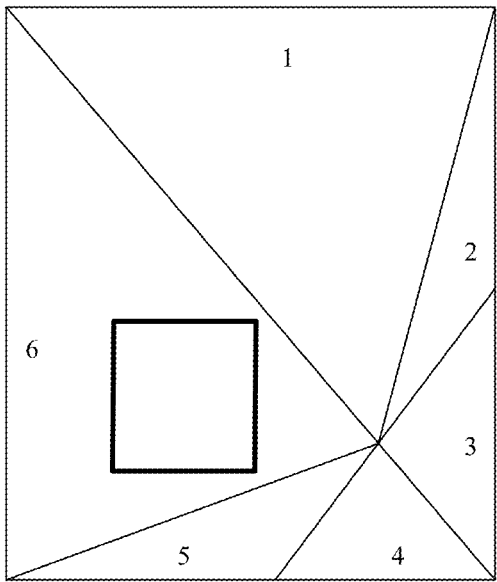
FIG. 1D is a schematic diagram of a pixel projection region according to an embodiment of this disclosure.

For example, as shown in FIG. 1D, a pixel projection region covers a part of a region of the mesh 6. In other words, the mesh 6 may cover a plurality of pixel projection regions at the same time.

In conclusion, a surface of each model in the space may be divided into a plurality of polygon meshes, and all vertices in the space are a set of vertices of the polygon meshes. A pixel projection region corresponding to one pixel may cover one or more meshes, and one mesh may also cover a pixel projection region corresponding to one or more pixels.

The light source 302 is a virtual light source provided in the space, and is configured to generate an illumination environment in the space. A type of the light source 302 may be any one of the following light sources: a point light source, an area light source, a linear light source, and the like. Further, the space may include one or more light sources 302. Further, when there are a plurality of light sources 302 in the space, different light sources may be of different types.

The operations such as the setting of the virtual viewpoint, the setting of the virtual viewplane, the establishment of the model, and the mesh division in the space are usually all completed before the rendering operation is performed. The foregoing steps may be performed by a rendering engine such as a video rendering engine or a game rendering engine. For example, the rendering engine may be a game rendering engine (unity) or an unreal engine (unreal).

After a relative position relationship between the virtual viewpoint, the virtual viewplane, the light source, and each model is set, the rendering engine may receive the relative position relationship and related information. The information includes a type and a quantity of virtual viewpoints, a distance from the virtual viewpoint to the virtual viewplane and a screen resolution, an illumination environment, a relative position relationship between each model and the virtual viewpoint, a mesh division of each model, mesh number information, mesh material information, and the like. After obtaining the foregoing information, the rendering engine may further perform the following rendering method 600.

Figure 2:
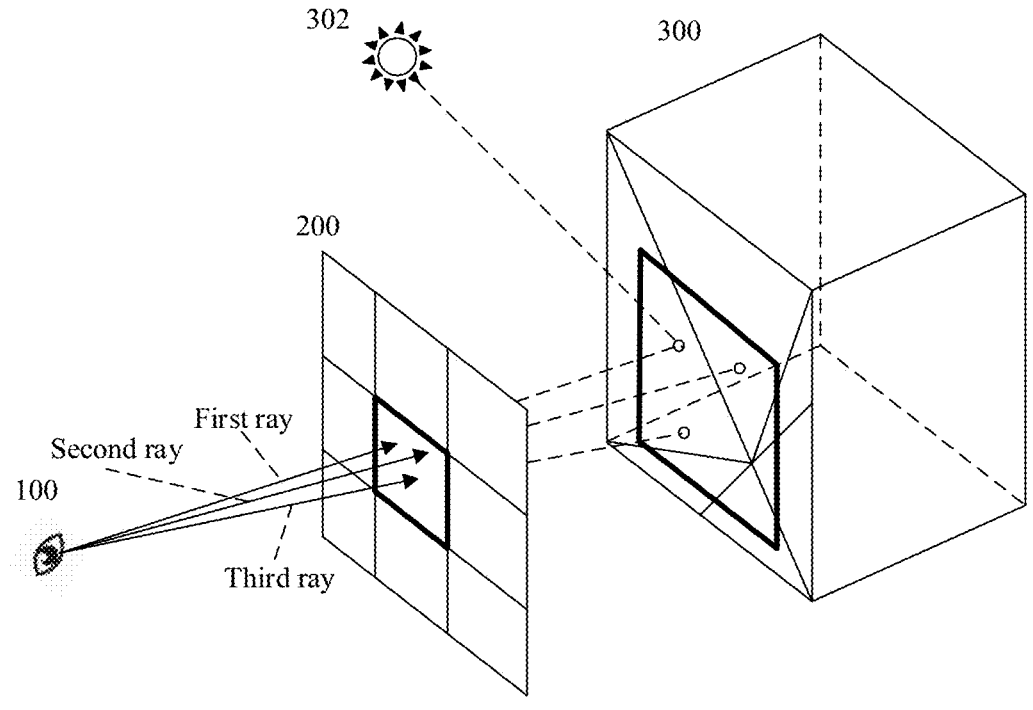
FIG. 2 is a schematic diagram of a rendering structure according to an embodiment of this disclosure.

The following describes an implementation method of ray tracing. FIG. 2 shows a diagram of a ray tracing scenario. The figure includes a virtual viewpoint 100, a virtual viewplane 200, a model 300, a light source 302, and three rays (a first ray, a second ray, and a third ray).

The virtual viewplane 200 presents a rendering result on a per-pixel basis, and a rendering result of each pixel is equal to an average value of rendering results of rays passing through the pixel in the current ray tracing process. Calculation of a rendering result of each ray belongs to the conventional technology, and therefore details are not described herein.

Actually, each ray is emitted from the light source, and after striking one or more meshes in the space, one of the following cases occurs at each striking point: refraction, reflection, or diffuse reflection. The ray then passes through the virtual viewplane 200 and finally enters the virtual viewpoint 100. That is, the ray enters the eyes of the user.

Each mesh has a specific color and material characteristic. The material of the mesh may be classified into a transparent material, a smooth opaque material, and a rough opaque material. Depending on different materials of the mesh, light refraction/reflection for the mesh may be further classified into refraction, reflection, and diffuse reflection. Refraction occurs when the ray strikes a transparent material, reflection occurs when the ray strikes an opaque material with a smooth surface, and diffuse reflection occurs when the ray strikes an opaque material with a rough surface.

It should be noted that, for a material on which diffuse reflection occurs, colors of rays reflected at the striking point from all angles are usually the same. In other words, on the premise that the relative positions and other conditions of the model and the light source remain unchanged, the same point at which diffuse reflection can occur is in the same color when seen from two different virtual viewpoints.

Therefore, theoretically, if colors of emergent rays of all points at which diffuse reflection can occur in the space may be stored at the point, the colors may be directly reused when the colors of the emergent rays at the point need to be calculated in the subsequent ray tracing. However, considering that there are countless points in the model, it is difficult to store and reuse rendering results for the points.

The color of the emergent ray is determined by a color of a mesh on which the light source and the striking point are located, and colors of various points on the same mesh are the same. Therefore, the point may be roughly extended to a tiny unit such as a mesh. In other words, a rendering result of each point may be stored on a mesh on which the point is located. Storing the rendering result on a per-mesh basis helps improve computing efficiency of ray tracing.

In ray tracing, it is considered that a ray is emitted from a virtual viewpoint, and therefore some rays may not return to the light source after striking the mesh, and then do not have a color. Therefore, calculation of a rendering result of each mesh in ray tracing requires a specific quantity of rays to be emitted to the mesh. Further, a rendering result of each mesh may be determined based on colors of these rays. For example, the rendering result to be stored on the mesh may be determined by deleting a rendering result of a ray with an excessively large difference in sample values and then calculating an average value.

It can be seen from FIG. 2 that the virtual viewplane 200 includes nine pixels in total. At least three rays, namely, a first ray, a second ray, and a third ray, emitted from the virtual viewpoint 100 pass through the center pixel (pixel with bold borders). Using the first ray as an example, after the first ray strikes the mesh 6 of the model 300 in the space, its emergent ray returns to the light source 302.

If a material of the triangle mesh 6 enclosed by the vertices D0, D1, and D6 is a transparent material or a smooth opaque material, that is, if refraction or reflection occurs, a rendering result of the first ray is not to be stored on the mesh 6.

If the material of the triangle mesh 6 enclosed by the vertices D0, D1, and D6 is a rough opaque material, that is, if diffuse reflection occurs, the rendering result of the first ray may be stored on the mesh 6.

It can be seen that both a first striking point corresponding to the first ray and a third striking point corresponding to the third ray fall within the mesh 6. As described above, rendering results of the first ray and the third ray may be different. The rendering result to be stored on the mesh 6 may be determined by calculating an average value of the rendering results of the two rays. Optionally, one rendering result that is clearly abnormal may be removed, and a rendering result of the other ray is used as the rendering result to be stored on the mesh 6.

The current ray tracing-based rendering method is limited by the computing power and the design of a conventional graphics processing unit (GPU) architecture. Rendering for only one viewpoint can be performed within the range of the viewpoint at a time. For example, when a plurality of users is connected to a network and enter a same rendering scenario moment, rendering results cannot be shared between GPU rendering processes. Actually, for a same rendering scenario, a large quantity of rays can be shared on a light path within the range of different user viewpoints. Light path distribution, illumination intensity distribution, a probability distribution function of current light distribution, and an optical transmission matrix, and the like in a large quantity of rendering scenarios may be shared and unbiased.

For a rendering-oriented process, especially real-time rendering, the current commercial ray tracing cannot provide a calculation method for multi-viewpoint simultaneous rendering. Currently, the computing process of most graphics cards is to perform ray tracing calculation for a viewpoint (camera) of a single user. Because the setting of the SPM and the number of bounces is limited by the computing power and the hardware design, after a noise-filled image is formed, post-processing still needs to be performed by using a timing reconstruction filter. That is, rendering results cannot be shared between different viewpoints. In addition, rendering results in different spaces cannot be shared.

In view of this, a rendering method that supports multi-viewpoint sharing is provided below. When a plurality of viewpoints is located in the same space at the same time, an intermediate calculation result of ray tracing may be shared between the plurality of viewpoints, and then a rendering result is output accordingly. Further, to improve quality of the foregoing output image, an intermediate rendering result of a mesh that is obtained by ray tracing for the plurality of viewpoints in some spaces that include the same meshes may be further utilized.

Figure 3A:
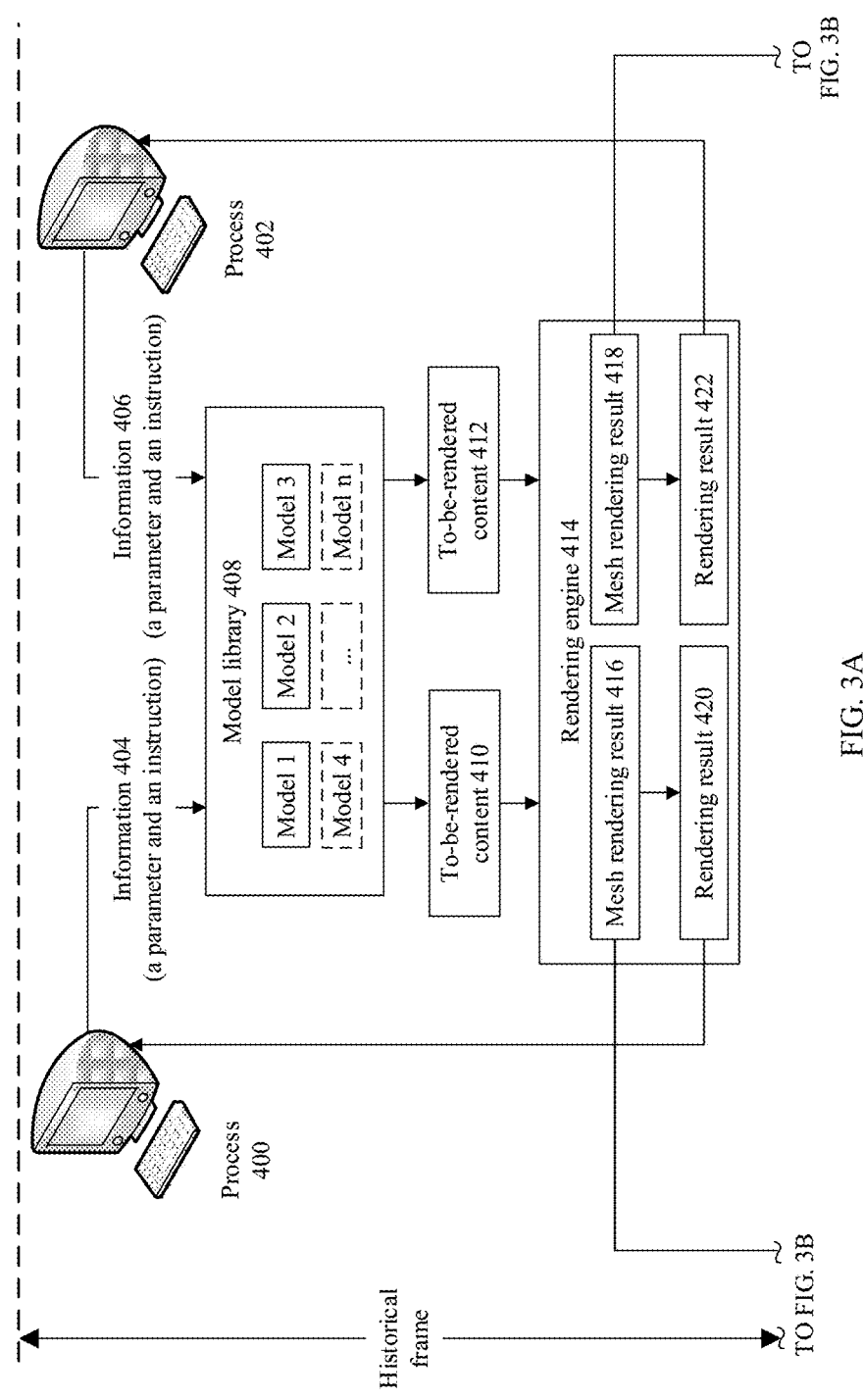
FIG. 3A and FIG. 3B are a schematic diagram of an application scenario including a plurality of processes according to an embodiment of this disclosure.
Figure 3B:
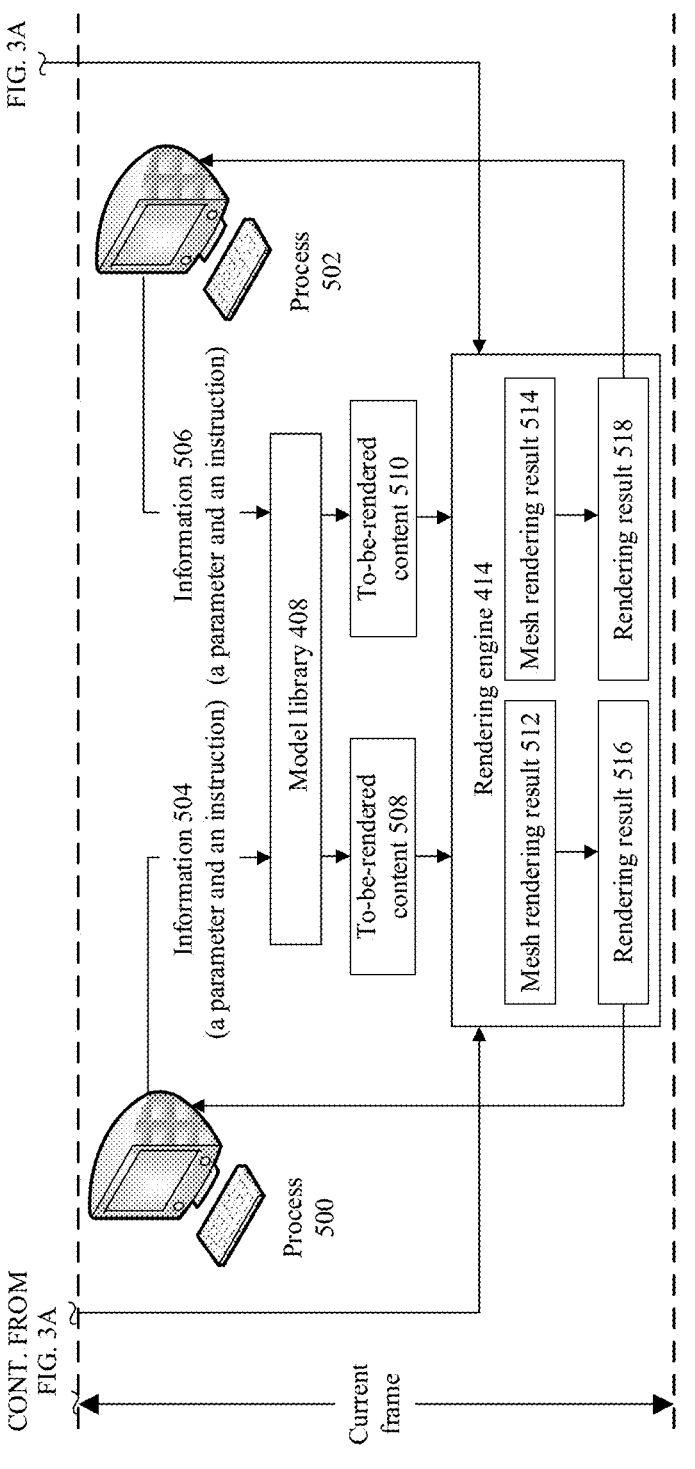

First, an application scenario including a plurality of processes is described. The plurality of processes belongs to one or more processes in an application. As shown in FIG. 3A and FIG. 3B, the scenario includes at least two different frames of images, that is, a historical frame and a current frame. In terms of time, the historical frame shown herein is formed earlier than the current frame.

As described above, one virtual viewpoint corresponds to one virtual viewplane, and a rendering result of one ray tracing for one virtual viewplane is one frame of image. In this case, one virtual viewpoint may correspond to one process. When a process generates a frame of image based on ray tracing, another process in the same frame may generate a frame of image at the same time.

For example, a process 400 and a similar process 402 are used as examples. In the conventional ray tracing-based rendering, the process 400 may form to-be-rendered content 410 by sending information 404 to a model library 408.

The model library 408 includes one or more models. Generally, a position of each model in a space is fixed. Optionally, a position of each model may also be controlled by the process 400 by sending an instruction. It should be noted that, for the model library 408, a light source may also be a model having a specific parameter.

The information 404 may include a parameter and an instruction. The parameter includes at least coordinate parameters of a virtual viewpoint and a virtual viewplane in the space. The instruction may include modification, movement, and the like of the model.

For example, in a game, a user may click a start button, and then send information to the model library 408 by using the process 400. The model library 408 generates an initialized model set, that is, the to-be-rendered content 410, by configuring a model. The to-be-rendered content includes one or more models and model information.

A mesh rendering result corresponding to a process in the historical frame may be used to determine a rendering result of a process in the current frame. A mesh rendering result corresponding to a process may include a mesh rendering result corresponding to one or more frames. In other words, a rendering result of the current viewplane may be calculated based on a mesh rendering result corresponding to at least one historical frame included in a process.

As described above, the historical frame may include one or more frames. An example in which a process in a historical frame corresponds to a rendering result of a viewplane in one frame is used as an example for description.

In the following description, the processes 400 and 500 are used as an example.

The process 400 may generate the to-be-rendered content 410 by sending the information 404 to the model library 408. A rendering engine may generate a mesh rendering result 416 based on the to-be-rendered content 410. Further, a rendering result 420 may be obtained for outputting.

Similarly, in the current frame, the process 500 may generate a rendering result 516 according to a method similar to the foregoing process. It should be noted that the rendering engine may generate a mesh rendering result 512 based on at least the mesh rendering result 416 in the historical frame. A premise of the foregoing case is that the to-be-rendered content 410 and to-be-rendered content 508 include one or more same meshes. Optionally, if to-be-rendered content 510 (412 in FIG. 3A) includes the same mesh as the to-be-rendered content 508, a mesh rendering result 418 may also be used to calculate the mesh rendering result 512.

In a possible implementation, the process 400 and the process 500 correspond to a same virtual viewpoint in different frames. To be specific, the process 400 and the process 500 are actually different processes in a same application, and a main difference lies in different running times.

For example, it is assumed that the historical frame is a previous frame of the current frame. In a game image, the image corresponding to the same viewpoint does not change greatly in several, especially two, consecutive frames. Therefore, one or more mesh rendering results in one or more historical frames may be reused, so as to improve quality and an obtaining speed of the mesh rendering result in the current frame.

In a possible implementation, the process 400 and the process 500 correspond to different virtual viewpoints in different frames. To be specific, the process 400 and the process 500 are actually different processes that run at different times in a same application.

For example, it is assumed that the historical frame is a previous frame of the current frame. In a game, two different viewpoints may correspond to two players at a long physical distance. In the game, there is a high probability that two spaces corresponding to rendering images of the two players include a same mesh in the two consecutive frames. For large online games, the number of concurrent online users ranges from 100,000 to 1,000,000. In addition, images of most players are in some typical scenes. The scene corresponds to a space including one or more meshes.

Therefore, reusing one or more mesh rendering results in a historical frame corresponding to one or more other viewpoints can greatly improve quality and an obtaining speed of the mesh rendering result in the current frame.

It should be noted that in the foregoing two possible implementations, the process shown in FIG. 3A and FIG. 3B may run on a local device or a cloud. Similarly, the model library and the rendering engine have similar deployment/running environments.

When the process may run on a local device, the local device may be a server. There may be one or more servers. Optionally, the local device may alternatively be a terminal device, for example, a mobile phone, a computer, or a tablet computer.

Optionally, the process may alternatively run on a cloud server. There may be one or more cloud servers.

The model library may be deployed on a local device. The local device may be a server. There may be one or more servers. Optionally, the local device may alternatively be a terminal device, for example, a mobile phone, a computer, or a tablet computer.

Optionally, the model library may alternatively be deployed on a cloud server. The model library needs to store a large amount of model data in an application, and therefore has a high requirement for storage. Some of the foregoing terminal devices, such as a mobile phone and a tablet computer, may not have a capability of storing a large amount of data. Therefore, the model library needs to be deployed on one or more cloud servers.

An input of the rendering engine is to-be-rendered content, and an output is a rendering result corresponding to the to-be-rendered content. Optionally, a rendering result of a mesh included in the to-be-rendered content may be further output.

The rendering engine may be a computing device cluster including one or more computing devices, or may be a computer program product, or may be a physical apparatus.

All the foregoing devices or products may be deployed on a local device side. Optionally, they may be all deployed on a cloud server side.

For example, in one of the possible implementations described above, that is, when the process 400 and the process 500 are actually different processes corresponding to a same application, for some applications with a small amount of model data, both the process and the model library may be deployed on a local device. Considering a computing amount of ray tracing, the rendering engine may be deployed on the cloud server side. For some applications with a small amount of model data, the model library may be deployed on a local device. The rendering engine and the model library may be deployed on the cloud server side.

For another example, in the other of the possible implementations described above, that is, when the process 400 and the process 500 are actually different processes in different applications, the process may run on a local device, while the model library and the rendering engine are more suitable to be deployed on the cloud server side.

The following describes a diagram of a structure of a rendering scenario including a plurality of viewpoints. As shown in FIG. 4, a diagram of a structure of a multi-viewpoint scenario (see Historical frame) includes at least two virtual viewpoints 100 and 102, virtual viewplanes 200 and 202 corresponding to the two virtual viewpoints, a model 300, and a light source 302. A diagram of a structure of a multi-viewpoint scenario (see Current frame) includes at least two virtual viewpoints 104 and 106, virtual viewplanes 204 and 206 corresponding to the two virtual viewpoints, a model 300, and a light source 302.

The virtual viewpoint herein corresponds to the process in FIG. 3A and FIG. 3B. One virtual viewpoint corresponds to one process. The model may correspond to a model in the model library in FIG. 3A and FIG. 3B.

The following provides an overview of the establishment and update of an information table in a space based on FIG. 4.

FIG. 4 includes two frames of images, which are respectively a historical frame on the left and a current frame on the right.

The current frame on the right is used as an example. After to-be-rendered content including the model 300 and the light source 302 is received, a current initial common information table is established for one or more models 300 included in the to-be-rendered content. Herein, the to-be-rendered content includes one model 300. The common information table is established by using a mesh in the model as a unit, and further includes information such as a rendering result of each mesh.

In addition, an initial correspondence table is established for each virtual viewplane in the current frame. For example, for a virtual viewplane 206 corresponding to a virtual viewpoint 106, a current initial correspondence table is established. The correspondence table is established by using a pixel in the virtual viewplane as a unit, and further includes information such as a correspondence between each pixel and each mesh in the model and a color of each pixel.

It should be noted that there is no time sequence for establishing the initial common information table and the initial correspondence table.

Similarly, for the historical frame on the left, a historical initial common information table has also been established for the model 300, and a historical initial correspondence table has been established for the virtual viewplane 102. In addition, a historical common information table has been obtained in the historical frame based on the historical initial common information table and the historical initial correspondence table.

It should be noted that the historical common information table is obtained earlier than a current common information table, but the historical common information table is obtained not necessarily earlier than the establishment time of the current initial common information table.

In the current frame on the right, a current correspondence table may be obtained based on the historical common information table, so as to obtain a rendering result of the virtual viewplane 206. The following describes two possible implementations. In the following two possible implementations, a same implementation is used for the current frame and the historical frame.

In a possible implementation, the current initial common information table is first established based on the historical common information table, and then a mesh that requires ray tracing in the current initial common information table is determined based on the current initial correspondence table. After ray tracing-based rendering is performed on the mesh, the current initial common information table is updated to obtain the current common information table. Further, the current initial correspondence table is updated based on the current common information table, to obtain the current correspondence table. Finally, the rendering result corresponding to the viewplane 206 is determined based on the current correspondence table.

In a possible implementation, ray tracing-based rendering is first performed on a mesh in the to-be-rendered content, and the current initial common information table is established based on a result of the ray tracing-based rendering. Then, the current initial common information table is updated based on the historical common information table to obtain the current common information table. The current initial correspondence table is updated based on the current common information table, to obtain the current correspondence table. Finally, the rendering result corresponding to the viewplane 206 is determined based on the current correspondence table.

The following describes the rendering method in detail.

FIG. 5 is a flowchart of a rendering method, and describes a rendering method 600. FIG. 5 shows flowcharts of rendering of two viewplanes, which respectively correspond to flowcharts of rendering of a current viewplane and a historical viewplane. In terms of time, the current viewplane corresponds to a current frame, and the historical viewplane corresponds to a historical frame.

It should be noted that a rendering method for the historical viewplane is consistent with a rendering method for the current viewplane, and both are the rendering method 600. Therefore, the following description focuses on the flowchart corresponding to the current viewplane.

The rendering method may be performed by a rendering engine 800. The method includes three parts: preprocessing, ray tracing, and obtaining a current rendering result.

First, the preprocessing includes S200 to S204.

S200: The rendering engine 800 obtains current to-be-rendered content and related parameters.

First, the rendering engine 800 obtains the current to-be-rendered content. The current rendered content may be generated based on the process in FIG. 3A and FIG. 3B. The current to-be-rendered content may be formed after selection and combination of models in the model library based on the parameter and the instruction included in the process. Therefore, the to-be-rendered content may be obtained from an apparatus or a process that can invoke the model library based on the information about the process.

Second, the to-be-rendered content includes one or more models and information about the models, for example, the model 300 in FIG. 4. A mesh division of each model, a mesh number, and coordinates of each model and mesh.

In addition, the related parameters include coordinates of a virtual viewpoint and a virtual viewplane, a light source parameter, and the like.

After obtaining the current to-be-rendered content and the related parameters, the rendering engine 800 may render the current to-be-rendered content.

S202: The rendering engine 800 establishes a current initial common information table by using a mesh in the current to-be-rendered content as a unit.

The current initial common information table may be established based on a number of each mesh in the current to-be-rendered content obtained in S200. The current initial common information table includes the number of each mesh and a sample value, a rendering result, and a material of each mesh.

First, the sample value of each mesh and a stored rendering result may be initialized. The sample value is a quantity of times a mesh is used as a mesh that is first struck by a ray in a space in a ray tracing process.

Color may be represented in an RGB mode, a cyan, magenta, yellow, and key (CMYK) mode, a Lab mode, or the like. The following uses the RGB mode as an example. FIG. 6 shows a current initial common information table, where meshes are sequentially numbered from 1 to p, and p indicates a quantity of meshes in the space.

Both the sample value and the stored rendering result need to be initialized. Optionally, an initial value of a sample value of each mesh may be set to 0.

Optionally, in some possible implementations, the current initial common information table may alternatively be initialized based on a historical common information table obtained in the historical frame. Details about how to obtain the historical common information table are described below.

It should be noted that, when the historical viewplane has a corresponding historical common information table, a sample value and a rendering result that correspond to each mesh may be queried in the historical common information table based on the mesh number in the current initial common information table established in S202. Further, initial values of the sample value corresponding to each mesh and the stored rendering result in the current initial common information table are updated to the sample value and the rendering result that are obtained by querying.

It should be noted that there is no fixed execution time sequence between step S200 and step S202. In other words, step S202 may be performed before step S200, or may be performed after step S200, or may be performed simultaneously with step S200.

S204: The rendering engine 800 establishes a current initial correspondence table corresponding to the current viewplane.

A corresponding position of each mesh on the current viewplane may be determined based on the coordinates of each mesh obtained in S200, so as to establish a correspondence between each mesh in the current to-be-rendered content and each pixel in the current viewplane. Further, the current initial correspondence table may be established based on the correspondence. The current initial correspondence table includes a correspondence between a pixel and a mesh, a depth value and a stored rendering result of the mesh, and a rendering result of the pixel.

A mesh is a tiny unit in a three-dimensional space. After a series of coordinate system changes from a model coordinate system to a world coordinate system, then to a view coordinate system, then to a projection coordinate system, and finally to a viewport coordinate system, the mesh is finally mapped to a two-dimensional viewplane. Each pixel in the viewplane is traversed, to determine whether a part or all of the region of the pixel is covered by a mesh. For a pixel covered by a mesh, a correspondence between the pixel and the mesh is recorded. A coverage relationship between a pixel and a mesh has been described above, and details are not described again. In addition, the pixels in the viewplane need to be numbered.

FIG. 7 shows a current initial correspondence table between a pixel and a mesh in the current viewplane. The current initial correspondence table includes a correspondence between a pixel and a mesh, a depth value and a rendering result of the mesh, and a rendering result of the pixel.

As shown in FIG. 7, the correspondence between a pixel and a mesh may be that one pixel corresponds to one or more meshes. For example, meshes 1, 2, and 6 each cover a part or all of an area of a pixel 1. A mesh m covers a part or all of an area of a pixel n. n and m are not necessarily equal.

It should be noted that when a plurality of meshes correspond to one pixel, the plurality of meshes may cover the same or different regions in the pixel. Due to different depths of the meshes, regions in the same pixel that are covered by two or more meshes may overlap.

The correspondence between a pixel and a mesh may alternatively be that one or more pixels correspond to one mesh. For example, the mesh 1 covers a part or all of an area of pixels 1 and 2.

A depth of each mesh may be calculated based on depths of vertices at which line segments enclosing the mesh meet. The depth of each mesh may be equal to an average value of the depths of the foregoing vertices. The average value may be an arithmetic average value or a weighted average value.

Optionally, a visible mesh corresponding to each pixel may be determined based on the depth of the mesh and a material of each mesh in the current initial common information table, thereby improving ray tracing-based rendering efficiency. A visible mesh may be a target mesh, that is, as a target for ray tracing-based rendering. A specific method for determining the visible mesh is described in detail in S406.

In step S204, initialization processing further needs to be separately performed on the rendering result stored on the visible mesh and the pixel rendering result. Both the rendering result stored on the visible mesh and the pixel rendering result are initialized to 0.

It should be noted that there is no fixed execution time sequence between step S202 and step S204. In other words, step S404 may be performed before step S402, or may be performed after step S402, or may be performed simultaneously with step S402.

Based on a first common information table and a first correspondence table that are respectively established in S402 and S404, the mesh that requires ray tracing may be further determined. The ray tracing includes S206 and S208.

S206: The rendering engine 800 performs ray tracing on some meshes based on the current initial correspondence table and the current initial common information table.

A visible mesh set corresponding to each pixel is determined based on the mesh number corresponding to each pixel in the current initial correspondence table and the depth value and the material corresponding to the mesh. The visible mesh set is a set of meshes that belong to visible meshes among the meshes corresponding to the pixel. A ray tracing operation is performed on some visible meshes based on a sample value and a sample threshold of each mesh in the visible mesh set.

First, a visible mesh set corresponding to each pixel may be obtained based on the material of the mesh, and the mesh number and the mesh depth value in the current initial relationship table.

A visible mesh set for each pixel is separately determined on a per-pixel basis. When one pixel corresponds to one mesh, the mesh is a visible mesh. When one pixel corresponds to a plurality of meshes, the meshes should be arranged in ascending order of depths. In this case, in ascending order of depths, the visible meshes include meshes with depth values less than or equal to a depth value of the first mesh of an opaque material.

FIG. 7 is used as an example. The pixel n corresponds to the mesh m. In this case, regardless of whether the mesh m is of an opaque material, the mesh m is a visible mesh. The pixel 1 corresponds to the meshes 1, 2, and 6. It is assumed that a depth relationship between the three meshes is $D1<D2<D6$, the mesh 2 is of an opaque material, and both the meshes 1 and 6 are of a transparent material. For the pixel 1, a depth of the first mesh of an opaque material is D2.

Therefore, the visible mesh should include meshes with depth values less than or equal to D2, that is, the meshes 1 and 2.

It should be noted that different pixels in the viewplane may correspond to different visible mesh sets.

Second, after the visible mesh set corresponding to each pixel is obtained, a ray tracing operation may be performed on some meshes based on a sample threshold in the current initial common information table. The sample threshold may be set as required. A sample value corresponding to a mesh in the visible mesh set in the current initial common information table is queried.

If the sample value of the mesh is greater than or equal to the sample threshold, a rendering result of the mesh is directly obtained to update the current initial common information table.

If the sample value of the mesh is less than the sample threshold, a ray tracing operation is performed on the mesh.

Optionally, if the sample value of the mesh is less than the sample threshold, the ray tracing operation is performed on the mesh based on a specific probability. For a to-be-sampled mesh slice set consisting of visible meshes with sample values less than the sample threshold, k meshes are randomly selected from the to-be-sampled mesh set for random sampling. Herein, k may be set as required, and k is less than or equal to a quantity of meshes in the to-be-sampled mesh set. A method for selecting the k meshes may be a simple random sampling method, or may be a method such as a low-discrepancy sequence. A random sampling method may be simple random sampling, or may be a method such as super sampling.

A process of ray tracing is separately emitting rays from a virtual viewpoint to the k meshes in the space, and performing ray tracing. A same quantity or different quantities of rays may be separately emitted from the virtual viewpoint to the k meshes. It should be noted that, regardless of whether the same quantity or different quantities of rays are emitted, a quantity of rays reaching each mesh in each sampling may be less than or equal to the sample threshold.

If a sample value of a mesh is 1, it indicates that the mesh is struck by one ray in the space. Therefore, a color of the mesh is calculated. If the sample value of the mesh is greater than 1, it indicates that the mesh is first struck by two or more rays in the space.

The calculation of an intermediate rendering result of the mesh is implemented by separately calculating colors of the rays emitted from the virtual viewpoint. A rendering result of the mesh with the sample value of 1 is the color of the ray. A rendering result of the mesh with the sample value greater than or equal to 2 is equal to an average value of sampled rays on the mesh. The average value may be an arithmetic average value or a weighted average value.

S208: The rendering engine 800 obtains a current correspondence table and a current common information table based on a ray tracing result.

The current common information table and the current correspondence table may be obtained based on the intermediate rendering result, obtained in step S206, of the mesh in the to-be-sampled mesh set.

When it is determined in S206 that the sample value of the visible mesh is greater than or equal to the sample threshold, the rendering result of the mesh is directly obtained to update the current initial common information table. In addition, the sample value of the mesh in the current initial common information table is not modified. Therefore, the information about the mesh is consistent in the current initial common information table and the current common information table.

When it is determined in S206 that the sample value of the visible mesh is less than the sample threshold, the current rendering result may be obtained based on the rendering result of the mesh in the current initial common information table and the intermediate rendering result of the mesh that is obtained in step S206. Further, the current initial common information table is updated based on the current rendering result.

In a possible implementation, the current rendering result may be determined by using a method of calculating an average value of the rendering result of the mesh in the current initial common information table and the intermediate rendering result of the mesh that is obtained in step S206. The average value may be an arithmetic average value or a weighted average value. A rendering result corresponding to the to-be-sampled mesh in the current initial common information table is updated to the current rendering result. In addition, an update operation is performed on the sample value of the to-be-sampled mesh in the current initial common information table. FIG. 8 shows a current common information table.

In this possible implementation, for example, the mesh 1 is a visible mesh, and a sample value S1 of the mesh 1 in the current initial common information table shown in FIG. 6 is greater than the sample threshold. That is, when the common information table is updated, an update operation does not need to be performed on the sample value and the rendering result of the mesh 1. For another example, the mesh 2 is a visible mesh, and a sample value S2 of the mesh 2 in the current initial common information table shown in FIG. 6 is less than the sample threshold. That is, the sample value and the rendering result of the current common information table shown in FIG. 8 need to be updated. A rendering result C2 in FIG. 6 is updated to C2'. C2' is equal to an average value of the rendering result of the mesh 2 in step S206 and C2. In addition, a sample value S2 of the mesh 2 in FIG. 6 and FIG. 8 further needs to be updated to S2'. S2' is equal to S2 plus the quantity k of sampled rays on the mesh 2 in step S206.

The current initial correspondence table in FIG. 7 may be updated based on the current common information table, to obtain the current correspondence table.

The rendering result of the visible mesh in the current correspondence table may be obtained based on the current common information table. Further, a rendering result of a pixel grid may be obtained. For example, as shown in FIG. 7, for the pixel 1, among its corresponding meshes 1, 2, and 6, the mesh 6 is an invisible mesh. Therefore, rendering results C1 and C2' of visible meshes corresponding to the pixel 1 may be obtained by performing a query in the current common information table shown in FIG. 8 by using the meshes 1 and 2 as a unit.

The pixel rendering result may be determined based on the rendering results of the visible meshes corresponding to the pixel. The pixel rendering result may be equal to an average value of the rendering results of the visible meshes. The average value may be an arithmetic average value or a weighted average value. For example, in the current correspondence table shown in FIG. 9, a rendering result P1 of the pixel 1 is equal to an average value of C1 and C2'.

In a possible implementation, the rendering result of the mesh in the current initial common information table and an extended intermediate rendering result sequence of the mesh obtained in step S206 may further form a first sequence.

Further, the current rendering result may be determined by calculating a variance of the first sequence.

As mentioned in the foregoing possible implementation, the current rendering result may be equal to the average value of the rendering result of the mesh in the current initial common information table and the intermediate rendering result of the mesh that is obtained in step S206. In other words, the current rendering result may be obtained by multiplying a sequence formed by the rendering result of the mesh in the current initial common information table and the intermediate rendering result of the mesh that is obtained in step S206 by a specific coefficient matrix. Therefore, a sequence may be obtained by dividing the current rendering result by the foregoing coefficient matrix. The sequence is the extended current rendering result sequence.

Similarly, an extended intermediate rendering result sequence that is obtained in step S206 is obtained by dividing the intermediate rendering result of the mesh that is obtained in step S206 by the coefficient matrix. It should be noted that, in this embodiment, the rendering result is updated frame by frame. Therefore, the coefficient matrix may be a fixed value, or may be a coefficient matrix used in a process of updating a rendering result in a previous frame. For the intermediate rendering result of the mesh that is obtained in step S206 in the first frame (that is, the rendering result initialized in step S202), a coefficient matrix with a fixed value may be used.

In this possible implementation, for example, the mesh 1 is a visible mesh, and a sample value S1 of the mesh 1 in the current initial common information table shown in FIG. 6 is greater than the sample threshold. That is, when the common information table is updated, an update operation does not need to be performed on the sample value and the rendering result of the mesh 1. For another example, the mesh 2 is a visible mesh, and a sample value S2 of the mesh 2 in the current initial common information table shown in FIG. 6 is less than the sample threshold. That is, the sample value and the rendering result of the mesh need to be updated.

The intermediate rendering result of the mesh 2 in step S206 and the extended C2 corresponding to the mesh 2 form a new sequence corresponding to the mesh 2. A variance of the new sequence is calculated, and the current rendering result is determined based on the variance and a first variance threshold. The first variance threshold may be set as required.

When the variance of the sequence is greater than the first variance threshold, the rendering result corresponding to the mesh 2 in the current initial common information table is updated to C2'. C2' is equal to the intermediate rendering result of the mesh 2 in step S206. In addition, the sample value S2 corresponding to the mesh 2 in the current initial common information table is updated to S2'. S2' is equal to 1.

When the variance of the sequence is less than or equal to the first variance threshold, the rendering result corresponding to the mesh 2 in the current initial common information table is updated to C2'. C2' is equal to an average value of the intermediate rendering result of the mesh 2 in step S206 and C2. The average value may be an arithmetic average value or a weighted average value.

The current initial correspondence table in FIG. 7 may be updated based on the current common information table in the foregoing two cases.

The rendering result of the visible mesh in the current correspondence table may be obtained based on the current common information table. Further, a rendering result of a pixel grid may be obtained. For example, for the pixel 1, among its corresponding meshes 1, 2, and 6, the mesh 6 is an invisible mesh. Therefore, rendering results C1 and C2' of visible meshes corresponding to the pixel 1 may be obtained by performing a query in the current common information table shown in FIG. 8 by using the meshes 1 and 2 as a unit.

The pixel rendering result may be determined based on the rendering results of the visible meshes corresponding to the pixel. The pixel rendering result may be equal to an average value of the rendering results of the visible meshes. The average value may be an arithmetic average value or a weighted average value. For example, in the current correspondence table shown in FIG. 9, a rendering result P1 of the pixel 1 is equal to an average value of C1 and C2'.

It should be noted that a method for obtaining the historical common information table used in step S202 is the same as a method for obtaining the current common information table in this step.

In S206, ray tracing-based rendering is performed on the meshes in the to-be-sampled mesh set, and the intermediate rendering result of each mesh in the to-be-sampled mesh set is obtained. The current common information table and the current correspondence table may be obtained based on the intermediate rendering result of the current mesh, so as to obtain the current rendering result. The obtaining a current rendering result includes S210.

S210: The rendering engine 800 obtains the current rendering result.

The current rendering result may be obtained based on the rendering result of each pixel in the current correspondence table.

It should be noted that the current rendering result obtained in S210 may be used for direct outputting on an output screen, or may be used as an original image/data for a next denoising operation.

Figure 10:
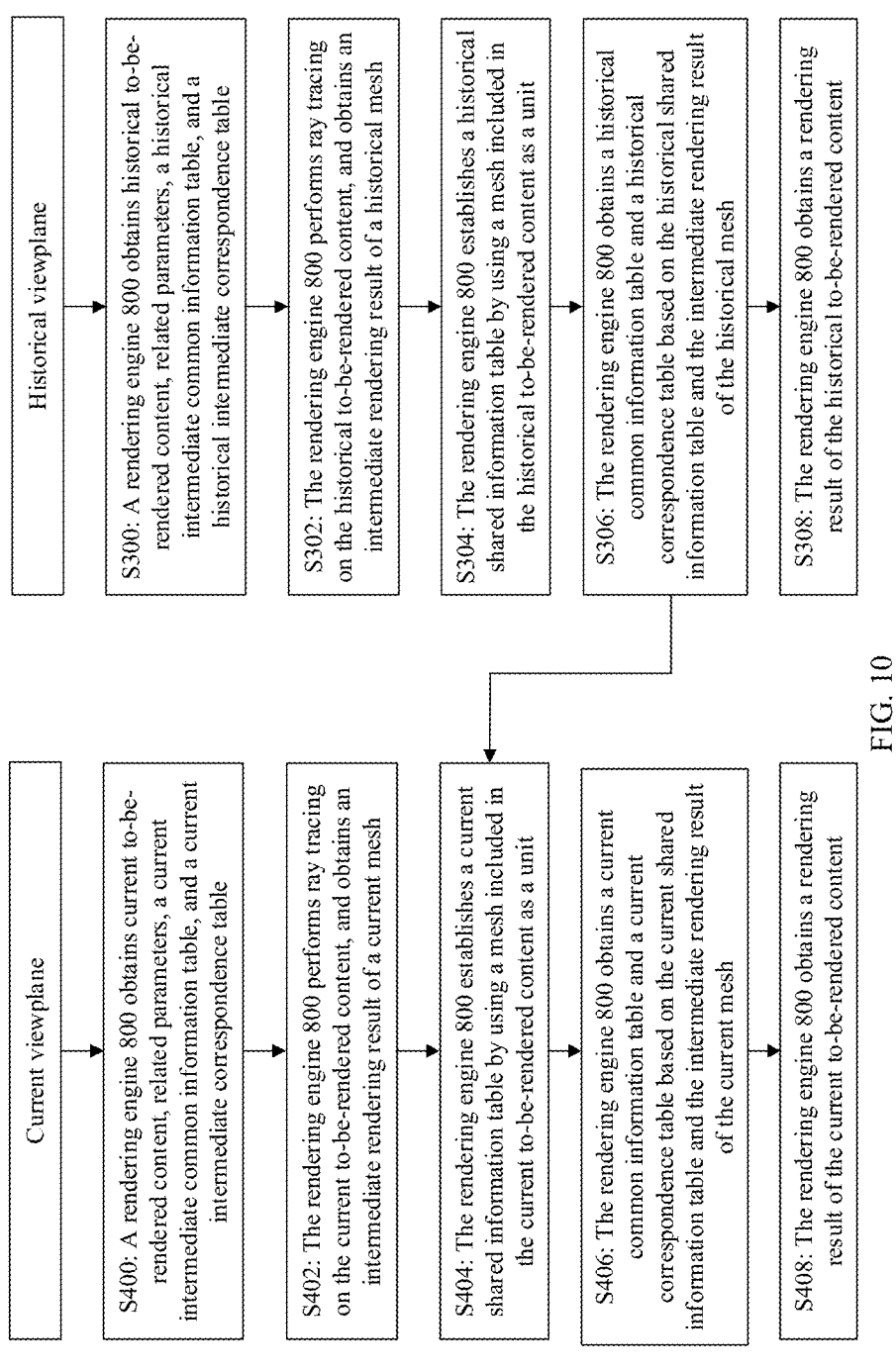
FIG. 10 is a flowchart of another rendering method according to an embodiment of this disclosure.

FIG. 10 is a flowchart of another rendering method, and describes a rendering method 700. FIG. 10 shows flowcharts of rendering of two viewplanes, which respectively correspond to flowcharts of rendering of a current viewplane and a historical viewplane. In terms of time, the current viewplane corresponds to a current frame, and the historical viewplane corresponds to a historical frame.

As described above, in this disclosure, there are at least two implementation methods for obtaining a current correspondence table based on a historical common information table, so as to obtain a rendering result corresponding to a viewplane. The first method is the rendering method 600 shown in FIG. 5. Another rendering method 700 is provided below.

In the rendering method 600, before ray tracing is performed on to-be-rendered content, a current initial common information table of the to-be-rendered content is initialized based on a historical common information table, so as to obtain a rendering result of a current mesh, and finally obtain a current rendering result of the to-be-rendered content. In the rendering method 700, ray tracing-based rendering is first performed on to-be-rendered content to obtain an intermediate rendering result of a current mesh, and then a current rendering result of the to-be-rendered content is obtained based on a historical common information table.

It should be noted that the ray tracing-based rendering performed before a reuse step in the rendering method 700 may be conventional ray tracing-based rendering. Therefore, the intermediate rendering result of the current mesh in the rendering method 700 may be a rendering result of the mesh obtained through conventional ray tracing.

Optionally, the method may also be a ray tracing method such as the rendering method 600. Therefore, the intermediate rendering result of the current mesh in the rendering method 700 may also be a rendering result of the current mesh obtained in the rendering method 600.

It should be noted that the intermediate rendering result of the current mesh mentioned in the rendering method 700 is different from the intermediate rendering result of the current mesh mentioned in the rendering method 600. The intermediate rendering result indicates a rendering result of the mesh before the rendering result of the current mesh is finally obtained. That is, in the two methods, in a process of calculating the current rendering result of the mesh, an obtained process rendering result of the mesh is also the intermediate rendering result of the mesh. Generally, ray tracing-based rendering may be performed on the mesh to obtain the intermediate rendering result of the mesh. A quantity of traced rays for the ray tracing-based rendering is less than a threshold.

In FIG. 10, a rendering method for the historical viewplane is consistent with a rendering method for the current viewplane, and both are the rendering method 700. Therefore, the following description focuses on the flowchart corresponding to the current viewplane.

The rendering method 700 may be performed by a rendering engine 800. The method includes three parts: ray tracing, information reuse, and obtaining a current rendering result.

First, the ray tracing includes S400 and S402.

S400: The rendering engine 800 obtains current to-be-rendered content, related parameters, a current intermediate common information table, and a current intermediate correspondence table.

A method for obtaining, by the rendering engine, the current to-be-rendered content and the related parameters in this step is consistent with S200, and details are not described again.

It should be noted that the current intermediate common information table obtained by the rendering engine 800 may be a current common information table obtained in a conventional ray tracing process. Optionally, the current intermediate common information table may also be the current common information table obtained in step S208 in the rendering method 600. A method for obtaining the current common information table obtained in the conventional ray tracing process is similar to the method for establishing the current initial common information table in step S202 in the rendering method 600, and therefore details are not described again.

It should be noted that the current intermediate correspondence table obtained by the rendering engine 800 may be a current correspondence table obtained in a conventional ray tracing process. Optionally, the current intermediate correspondence table may also be the current correspondence table obtained in step S208 in the rendering method 600. A method for obtaining the current correspondence table obtained in the conventional ray tracing process is similar to the method for establishing the current initial correspondence table in step S204 in the rendering method 600, and therefore details are not described again.

S402: The rendering engine 800 performs ray tracing on the current to-be-rendered content, and obtains an intermediate rendering result of the current mesh.

As described above, the current to-be-rendered content includes one or more models, and each model includes at least one mesh. Therefore, in this step, the intermediate rendering result of the current mesh may be obtained by performing ray tracing on the current to-be-rendered content.

A specific ray tracing method may be the conventional technology, and details are not described.

Optionally, for a specific ray tracing method, refer to the rendering method 600. In other words, the rendering result of the current mesh obtained in S208 in the rendering method 600 is the intermediate rendering result of the current mesh in this step.

After ray tracing is performed on the current to-be-rendered content in this step, a sample value of the mesh actually changes. Therefore, in some possible implementations, the sample value of the mesh in the to-be-rendered content in this case may be compared with the threshold. If the sample value is greater than the threshold, a rendering result may be directly output.

However, reuse may further improve a rendering result of the foregoing mesh. In addition, the rendering method 700 is applicable to a ray tracing method with a low sample value. It is generally considered that after sampling in S402 is performed, a sample value of the mesh may be less than the threshold. Based on the foregoing two points, the following describes a case in which the sample value of the mesh is less than the threshold.

After ray tracing-based rendering is performed on the to-be-rendered content, an intermediate rendering result of the current mesh may be obtained. Further, the rendering result of the current mesh may be obtained by reusing a part of information in the historical common information table. The information reuse includes S404 and S406.

S404: The rendering engine 800 establishes a current shared information table by using a mesh included in the current to-be-rendered content as a unit.

The current shared information table may be established based on the historical common information table by using a mesh in the current to-be-rendered content as a unit. A manner of obtaining the historical common information table is described below.

Optionally, the current shared information table may also be established by using a visible mesh in the current to-be-rendered content as a unit. A specific method for obtaining the visible mesh is similar to the method described in step S206 in the rendering method 600, and therefore details are not described again.

The following uses a visible mesh in the current to-be-rendered content as a unit to establish a current shared information table as an example for description.

First, a current total visible mesh set corresponding to the current viewplane is established based on a visible mesh set corresponding to each pixel in the current intermediate correspondence table. Meshes in the visible mesh set corresponding to each pixel are extracted to jointly form a current total visible mesh set.

Figures 11, 12, 13:
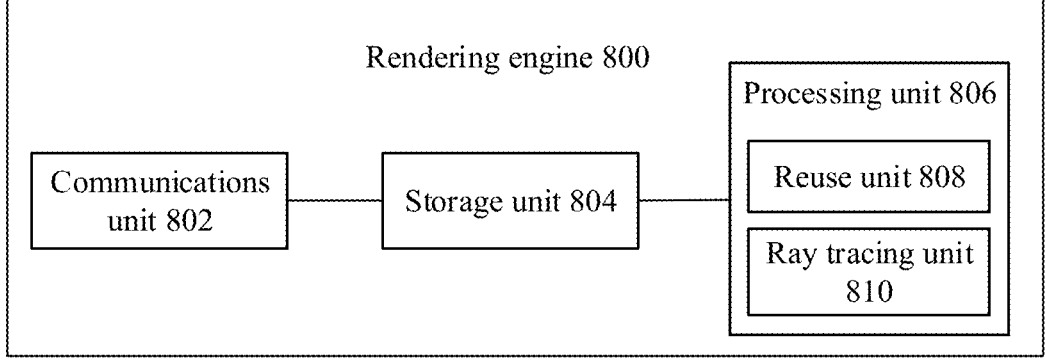
FIG. 11 shows a current shared information table according to an embodiment of this disclosure.
FIG. 12 shows another current correspondence table according to an embodiment of this disclosure.
FIG. 13 is a schematic diagram of a structure of a rendering engine according to an embodiment of this disclosure.

For example, as shown in FIG. 11, the current total visible mesh set includes at least meshes 1, 2, and n. n is less than or equal to p in FIG. 6. That is, n is less than or equal to a total quantity of meshes in the current to-be-rendered content.

It should be noted that visible meshes corresponding to different pixels may be partially the same. For example, in FIG. 9, a visible mesh set for a pixel 1 includes meshes 1 and 2, and a visible mesh set for a pixel 2 includes meshes 1, 3, and 4. That is, for both the pixel 1 and the pixel 2, the mesh 1 is a visible mesh. Optionally, for a mesh that repeatedly appears in the current total visible mesh set, the mesh only needs to appear once.

The current shared information table may be established by using a mesh in the current total visible mesh set as a unit. The current shared information table includes all visible meshes in the current to-be-rendered content, numbers corresponding to historical viewplanes corresponding to the visible meshes, and rendering results of the visible meshes in each space. The shared information table further includes an updated mesh rendering result, and an initial value is 0.

A mesh is selected from the current total visible mesh set, and a historical common information table stored in the rendering engine 800 is searched. When the historical common information table stores information about the mesh, a rendering result corresponding to the mesh is obtained in the historical common information table. Further, a rendering result corresponding to the mesh in each viewplane in the current shared information table is obtained. By analogy, a current shared information table may be established for all visible meshes in the current to-be-rendered content.

Optionally, in the rendering method 700, considering that rendering results of some meshes in the historical common information table may be reused after ray tracing, a quantity of traced rays may be properly reduced during ray tracing, to improve ray tracing efficiency. Whether the quantity of traced rays needs to be reduced may be determined based on an actual situation.

It should be noted that, in a ray tracing process, especially in the case of reducing the quantity of traced rays, it is possible that a quantity of traced rays in step S402 plus a quantity of traced rays in the rendering result of the historical mesh obtained in step S404 is still less than a sample threshold. In this case, it may be considered to calculate a probability of occurrence of such a case occurring in the application, and determine, based on the probability, whether to use such a method. Optionally, all meshes involved in this disclosure may be classified, and meshes corresponding to some models are selected to perform such a rendering method.

In this possible implementation, as shown in FIG. 11, a mesh 1 in the current to-be-rendered content is also a visible mesh in a second space, a third space, and a ninth space. In addition, rendering results corresponding to the mesh 1 on the foregoing three viewplanes are respectively C1-2, C1-3, and C1-9.

When the historical common information table stores information about the mesh, a rendering result corresponding to the mesh is extracted from the historical common information table. Further, a rendering result of the mesh in the shared information table is obtained. By analogy, a current shared information table may be established for the visible meshes in the current to-be-rendered content.

S406: The rendering engine 800 obtains a current correspondence table and a current common information table based on the current shared information table and the intermediate rendering result of the current mesh.

An updated rendering result of the visible mesh may be obtained based on the rendering result corresponding to each viewplane in the shared information table in FIG. 11.

The intermediate rendering result of the current mesh and the rendering result corresponding to each viewplane in the current shared information table form a second sequence. A rendering result of the visible mesh is updated based on a variance of the second sequence and a second variance threshold.

When the variance of the second sequence is less than or equal to the second variance threshold, the rendering result of the visible mesh in the current shared information table is updated to an average value of the second sequence. The average value may be an arithmetic average value or a weighted average value. Further, a rendering result corresponding to the mesh in the current intermediate correspondence table may be further updated.

As described above, the current intermediate common information table may be the current common information table obtained in the rendering method 600 (FIG. 8). In other words, the intermediate rendering result of the current mesh may be determined based on FIG. 8. Therefore, the following uses FIG. 11 as an example for description.

In FIG. 11, if the color C1 of the mesh 1 in the current intermediate common information table and the rendering results C1-2, C1-3, and C1-9 in the corresponding space in the shared information table jointly form a second sequence, and a variance of the second sequence is less than or equal to the second variance threshold, the rendering result corresponding to the mesh 1 in the current shared information table is determined as C1'. C1' is equal to an average value of C1, C1-2, C1-3, and C1-9. In addition, C1 in the rendering result of the visible mesh in the current correspondence table shown in FIG. 12 is updated to C1'.

When the variance of the second sequence is greater than the second variance threshold, the current shared information table is updated. The space number corresponding to the current mesh and the rendering result in the corresponding space in FIG. 11 are cleared. In addition, the rendering result of the visible mesh in the current intermediate correspondence table is not updated.

For example, in FIG. 11, if the color C1 of the mesh 1 in the current intermediate common information table shown in FIG. 8 and the rendering results C1-2, C1-3, and C1-9 in the corresponding space in the current shared information table jointly form a second sequence, and a variance of the second sequence is greater than the second variance threshold, the rendering result corresponding to the mesh 1 in the current shared information table is updated to C1'. C1' is equal to C1. In addition, the rendering result C1 in the rendering results of the visible mesh in FIG. 12 is not modified (because C1' is equal to C1).

After the current shared information table of the updated rendering result of the visible mesh is obtained, the current correspondence table in FIG. 12 may be obtained. Further, a rendering result of the current to-be-rendered content may be obtained.

For example, an updated and stored rendering result corresponding to the visible mesh 1 determined in FIG. 11 is C1'. At least rendering results of the mesh 1 in the rendering results of the visible meshes in the current correspondence table are separately updated to C1'. Further, a rendering result P1' of the pixel 1 is equal to an average value of C1' and C2".

When the current common correspondence table is obtained, the current intermediate common information table (as shown in FIG. 8) may be updated according to the rendering result of the mesh to obtain the current common information table.

It should be noted that a method for obtaining the historical common information table obtained in step S404 is the same as a method for obtaining the current common information table.

After the current correspondence table is obtained, the rendering result of the current to-be-rendered content may be obtained. The next step is obtaining the current rendering result.

S408: The rendering engine 800 obtains a rendering result of the current to-be-rendered content.

After the rendering result of the visible mesh in the current correspondence table is obtained, a rendering result of each pixel may be further determined, and the rendering result of the to-be-rendered content obtained in step S400 is obtained.

It should be noted that the rendering result obtained in S408 may be used for direct outputting on an output screen, or may be used as an original image/data for a next denoising operation.

This disclosure further provides a rendering engine 800. As shown in FIG. 13, the rendering engine 800 includes a communications unit 802, a storage unit 804, and a processing unit 806.

The communications unit 802 is configured to obtain current to-be-rendered content and a related parameter in S200. The communications unit 802 is further configured to receive a set sample threshold in S206. Optionally, the communications unit 802 is further configured to receive a first variance threshold in S208. In S400, the communications unit 802 is configured to obtain current to-be-rendered content, a related parameter, a current intermediate common information table, and a current intermediate correspondence table. The communications unit 802 is further configured to receive a second variance threshold in S406.

The storage unit 804 is configured to store model data of an application obtained in S200. In the rendering method 600, the storage unit 804 is configured to store a current initial common information table and a historical common information table that are obtained in S202. The storage unit 804 is further configured to store a current initial correspondence table obtained in S204. Both a current correspondence table and a current common information table that are obtained in S208 are stored in the storage unit 804. The storage unit 804 is further configured to store a current rendering result obtained in S210.

In the rendering method 700, the storage unit 804 is configured to store the current to-be-rendered content, the related parameter, the current intermediate common information table, and the current intermediate correspondence table that are obtained in S400. Both the intermediate rendering result of a current mesh obtained in S402 and a current shared information table obtained in S404 are stored in the storage unit 804. The storage unit 804 is further configured to store a current common information table and a current correspondence table that are obtained in S406. The storage unit 804 is further configured to store a rendering result that is of current to-be-rendered content and that is obtained in S408.

In the rendering method 600, the processing unit 806 is configured to establish the current initial common information table in S202 and establish the current initial correspondence table in S204. The processing unit 806 is further configured to perform ray tracing on some meshes based on a current correspondence table and a current common information table in S206. An operation of obtaining the current correspondence table and the current common information table in S208 is also performed by the processing unit 806. In addition, an operation of obtaining the current rendering result in S210 is also performed by the processing unit 806.

In the rendering method 700, the processing unit 806 is configured to perform ray tracing on current to-be-rendered content in S402 and obtain the intermediate rendering result of the current mesh. An operation of establishing the current shared information table in S404 is also performed by the processing unit 806. In step S406, the processing unit 806 is configured to obtain a current common information table and a current correspondence table based on the current shared information table and the intermediate rendering result of the current mesh. In addition, an operation of obtaining the current rendering result in S408 is also performed by the processing unit 806.

The processing unit 806 may include a reuse unit 808 and a ray tracing unit 810.

In the rendering method 600, the reuse unit 808 is configured to establish the current initial common information table in S202 and establish the current initial correspondence table in S204. The ray tracing unit 810 is configured to perform ray tracing on some meshes based on the current correspondence table and the current common information table in S206. An operation of obtaining the current correspondence table and the current common information table in S208 is also performed by the ray tracing unit 810. In addition, an operation of obtaining the current rendering result in S210 is also performed by the ray tracing unit 810.

In the rendering method 700, the reuse unit 808 is configured to perform ray tracing on the current to-be-rendered content in S402 and obtain the intermediate rendering result of the current mesh. An operation of establishing the current shared information table in S404 is also performed by the reuse unit 808. In step S406, the ray tracing unit 810 is configured to obtain the current common information table and the current correspondence table based on the current shared information table and the intermediate rendering result of the current mesh. In addition, an operation of obtaining the current rendering result in S408 is also performed by the ray tracing unit 810.

Optionally, the communications unit 202 is further configured to return the current rendering results obtained in S210 and S408.

Figure 14:
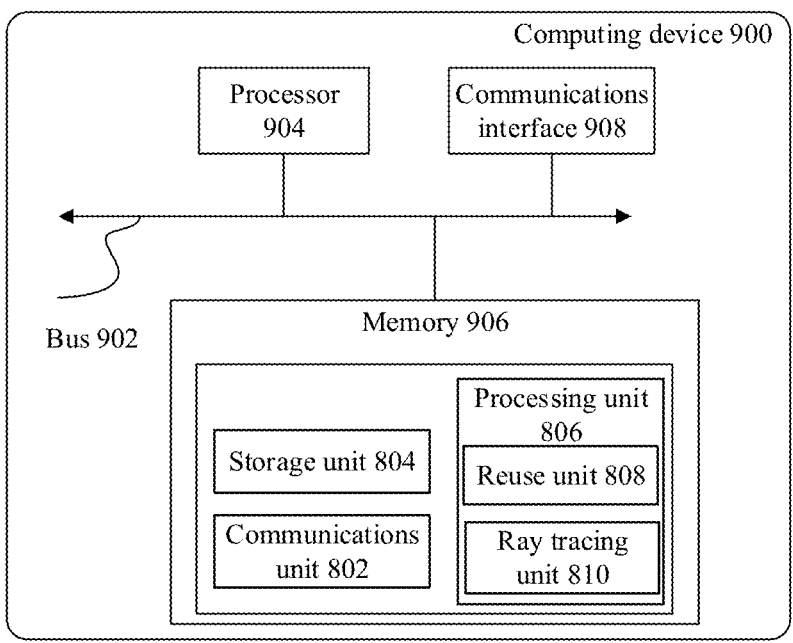
FIG. 14 is a schematic diagram of a structure of a computing device according to an embodiment of this disclosure.

This disclosure further provides a computing device 900. As shown in FIG. 14, the computing device includes a bus 902, a processor 904, a memory 906, and a communications interface 908. The processor 904, the memory 906, and the communications interface 908 communicate with each other through the bus 902. The computing device 900 may be a server or a terminal device. It should be understood that a quantity of processors and memories in the computing device 900 is not limited in this disclosure.

The bus 902 may be a Peripheral Component Interconnect (PCI) bus, an Extended Industry Standard Architecture (EISA) bus, or the like. The bus may include an address bus, a data bus, a control bus, and the like. For ease of indication, the bus is indicated by using only one line in FIG. 14. However, it does not indicate that there is only one bus or only one type of bus. The bus 902 may include a path for transferring information between various components (for example, the memory 906, the processor 904, and the communications interface 908) of the computing device 900.

The processor 904 may include any one or more of processors such as a central processing unit (CPU), a GPU, a microprocessor (MP), or a digital signal processor (DSP).

In some possible implementations, the processor 904 may include one or more graphics processing units. The processor 904 is configured to execute instructions stored in the memory 906, to implement the rendering method 600 or the rendering method 700.

In some possible implementations, the processor 904 may include one or more CPUs and one or more GPUs. The processor 904 is configured to execute instructions stored in the memory 906, to implement the rendering method 600 or the rendering method 700.

The memory 906 may include a volatile memory, for example, a random-access memory (RAM). The processor 904 may further include a non-volatile memory, for example, a read-only memory (ROM), a flash memory, a hard disk drive (HDD), or a solid-state drive (SSD). The memory 906 stores executable program code, and the processor 904 executes the executable program code to implement the rendering method 600 or the rendering method 700. The memory 906 stores instructions used by the rendering engine 800 to perform the rendering method 600 or the rendering method 700.

The communications interface 908 uses a transceiver module such as, but not limited to, a network interface card or a transceiver to implement communication between the computing device 900 and other devices or communications networks. For example, information 404, information 406, and the like may be obtained through the communications interface 908.

Figure 15:
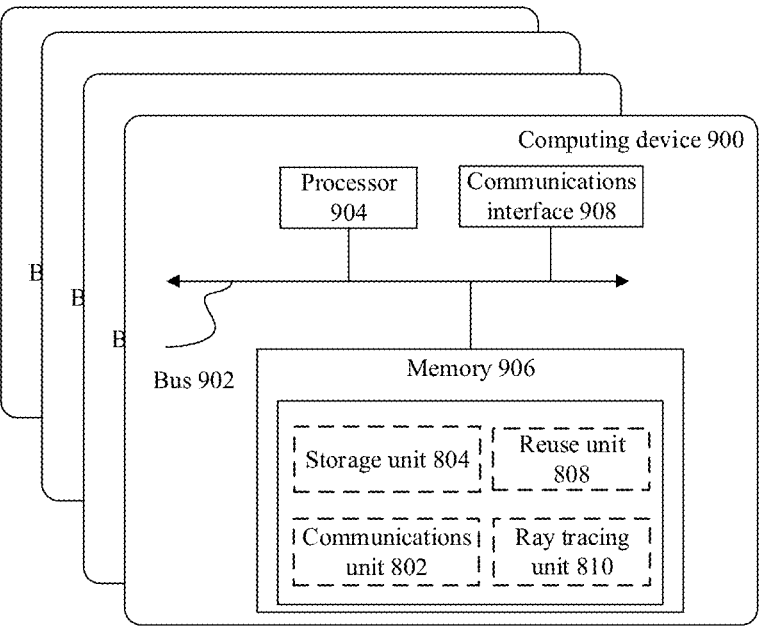
FIG. 15 is a schematic diagram of a structure of a computing device cluster according to an embodiment of this disclosure.

An embodiment of this disclosure further provides a computing device cluster. As shown in FIG. 15, the computing device cluster includes at least one computing device 900. The computing device included in the computing device cluster may be all terminal devices, or may be all cloud servers, or may be partially cloud servers and partially terminal devices.

In the foregoing three deployment manners related to the computing device cluster, a memory 906 in one or more computing devices 900 in the computing device cluster may store same instructions used by the rendering engine 800 to perform the rendering method 600 or the rendering method 700.

In some possible implementations, one or more computing devices 900 in the computing device cluster may also be configured to execute some instructions used by the rendering engine 800 to perform the rendering method 600 or the rendering method 700. In other words, a combination of one or more computing devices 900 may jointly execute the instructions used by the rendering engine 800 for performing the rendering method 600 or the rendering method 700.

It should be noted that memories 906 in different computing devices 900 in the computing device cluster may store different instructions for performing some functions of the rendering method 600 or the rendering method 700.

Figure 16:
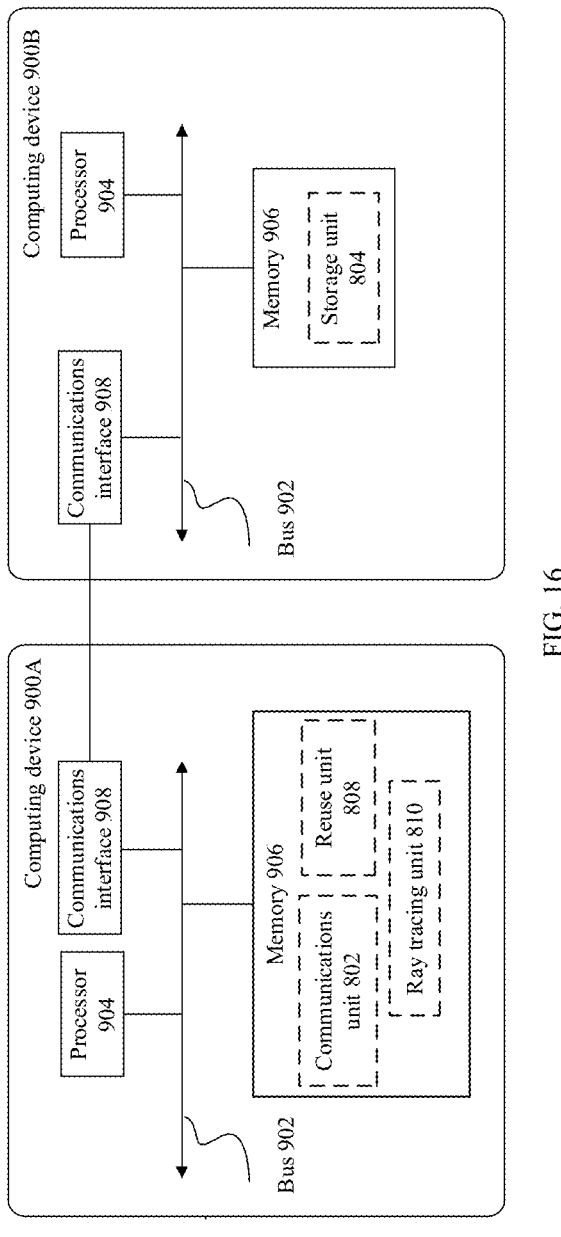
FIG. 16 is a schematic diagram of a connection manner of a computing device cluster according to an embodiment of this disclosure.

FIG. 16 shows a possible implementation. As shown in FIG. 16, two computing devices 900A and 900B are connected through a communications interface 908. A memory in the computing device 900A stores instructions for performing functions of a communications unit 802, a reuse unit 808, and a ray tracing unit 810. A memory in the computing device 900B stores instructions for performing functions of a storage unit 804. In other words, memories 906 of the computing devices 900A and 900B jointly store instructions used by the rendering engine 800 to perform the rendering method 600 or the rendering method 700.

A connection manner between computing device clusters shown in FIG. 16 may be based on a consideration that the rendering method 600 or the rendering method 700 provided in this disclosure needs to store a large number of historical rendering results of meshes in a historical frame. Therefore, it is considered that a storage function is performed by the computing device 900B.

It should be understood that functions of the computing device 900A shown in FIG. 16 may also be implemented by a plurality of computing devices 900. Similarly, functions of the computing device 900B may also be implemented by a plurality of computing devices 900.

Figure 17:
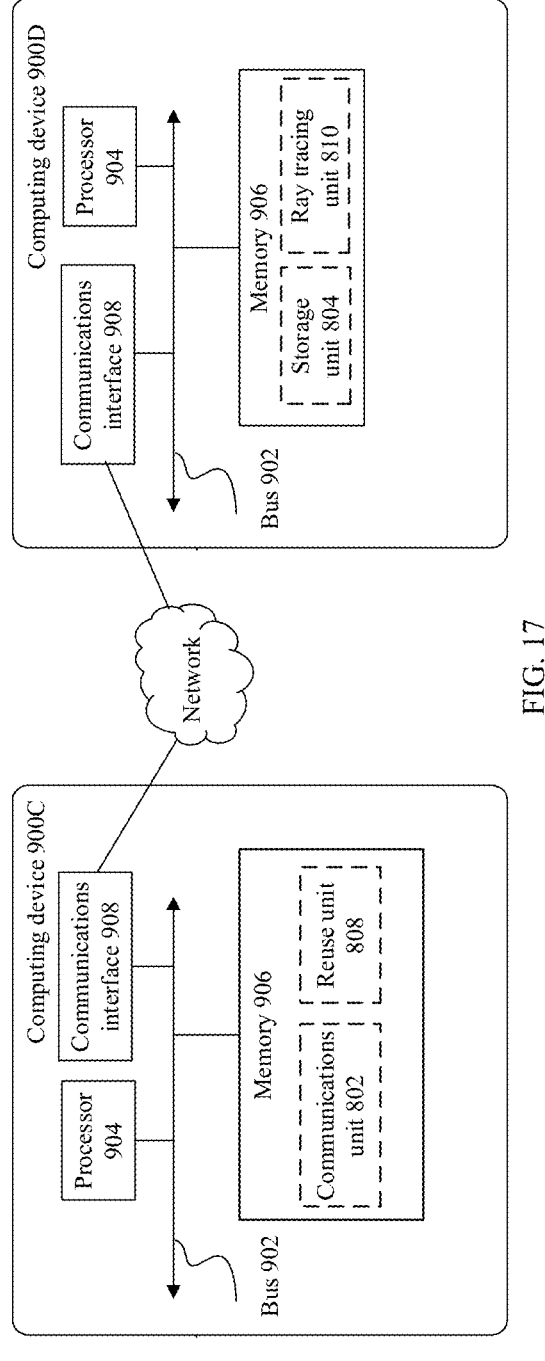
FIG. 17 is a schematic diagram of a connection manner of a computing device cluster according to an embodiment of this disclosure.

In some possible implementations, one or more computing devices in the computing device cluster may be connected via a network. The network may be a wide area network, a local area network, or the like. FIG. 17 shows a possible implementation. As shown in FIG. 17, two computing devices 900C and 900D are connected via a network. The computing devices are connected to the network through communications interfaces in the computing devices. In this possible implementation, a memory 906 in the computing device 900C stores instructions for executing a communications unit 802 and a reuse unit 808. In addition, the memory 906 in the computing device 900D stores instructions for executing a storage unit 804 and a ray tracing unit 810.

A connection manner between computing device clusters shown in FIG. 17 may be based on a consideration that the rendering method 600 or the rendering method 700 provided in this disclosure needs to perform a large number of calculations for ray tracing and store a large number of historical rendering results of meshes in a historical frame. Therefore, functions implemented by the ray tracing unit 810 and the storage unit 804 are considered to be performed by the computing device 900D.

It should be understood that functions of the computing device 900C shown in FIG. 17 may also be implemented by a plurality of computing devices 900. Similarly, functions of the computing device 900D may also be implemented by a plurality of computing devices 900.

An embodiment of this disclosure further provides a computer-readable storage medium. The computer-readable storage medium may be any usable medium that can be stored by a computing device, or a data storage device, such as a data center, including one or more usable media. The usable medium may be a magnetic medium (for example, a floppy disk, a hard disk, or a magnetic tape), an optical medium (for example, a digital versatile disc (DVD)), a semiconductor medium (for example, a solid-state disk), or the like. The computer-readable storage medium includes instructions, and the instructions instruct the computing device to perform the foregoing rendering method 600 or 700 applied to a rendering engine 800.

An embodiment of this disclosure further provides a computer program product including instructions. The computer program product may be a software or program product that includes instructions and that can run on a computing device or be stored in any usable medium. When the computer program product runs on at least one computing device, the at least one computing device is enabled to perform the rendering method 600 or 700.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of the present disclosure.

What is claimed is:

1. A rendering method comprising:

determining, in a first process of rendering a current frame of an application, a target mesh corresponding to a pixel in a current viewplane, wherein the application comprises at least one model, and wherein each of the at least one model comprises a plurality of meshes;

obtaining a historical rendering result of the target mesh that is from a second process of rendering a historical frame of the application, wherein the historical rendering result comprises a color of emergent rays of the target mesh; and using the historical rendering result to calculate, based on a threshold and a sample quantity corresponding to the historical rendering result, a first current rendering result of the pixel.

2. The rendering method of claim 1, further comprising determining that the sample quantity corresponding to the historical rendering result is greater than the threshold, wherein calculating the first current rendering result comprises using the historical rendering result as a second current rendering result of the target mesh, and wherein the second current rendering result is for calculating the first current rendering result.

3. The rendering method of claim 1, further comprising determining that the sample quantity corresponding to the historical rendering result is not greater than the threshold, wherein calculating the first current rendering result comprises:

performing ray tracing-based rendering on the target mesh to obtain an intermediate rendering result of the target mesh;

calculating, based on the intermediate rendering result and the historical rendering result, a second current rendering result of the target mesh; and calculating, based on the second current rendering result, the first current rendering result.

4. The rendering method of claim 3, further comprising storing the second current rendering result.

5. The rendering method of claim 1, wherein the current viewplane is from a first application, and wherein the historical rendering result is from a second application.

6. The rendering method of claim 1, wherein the historical rendering result and the current viewplane are from one application.

7. The rendering method of claim 1, wherein the historical rendering result is from ray tracing-based rendering.

8. A rendering engine comprising:

a memory configured to store instructions; and one or more processors coupled to the memory and configured to execute the instructions to:

determine, in a first process of rendering a current frame of an application, a target mesh corresponding to a pixel in a current viewplane, wherein the application comprises at least one model, and wherein each model comprises a plurality of meshes;

obtain a historical rendering result of the target mesh that is from a second process of rendering a historical frame of the application, wherein the historical rendering result comprises a color of emergent rays of the target mesh; and use the historical rendering result to calculate, based on a threshold and a sample quantity corresponding to the historical reading result, a first current rendering result of the pixel.

9. The rendering engine of claim 8, wherein the one or more processors are further configured to execute the instructions to:

determine that the sample quantity corresponding to the historical rendering result is greater than the threshold; and further calculate the first current rendering result by using the historical rendering result as a second current rendering result of the target mesh, and wherein the second current rendering result is for calculating the first current rendering result.

10. The rendering engine of claim 8, wherein the one or more processors are further configured to execute the instructions to:

determine that the sample quantity corresponding to the historical rendering result is not greater than the threshold; and further calculate the first current rendering result by:

performing ray tracing-based rendering on the target mesh to obtain an intermediate rendering result of the target mesh;

calculating, based on the intermediate rendering result and the historical rendering result, a second current rendering result of the target mesh; and calculating, based on the second current rendering result, the first current rendering result.

11. The rendering engine of claim 10, wherein the memory is further configured to store the second current rendering result.

12. The rendering engine of claim 8, wherein the current viewplane is from a first application, and wherein the historical rendering result is from a second application.

13. The rendering engine of claim 8, wherein the historical rendering result and the current viewplane are from one application.

14. The rendering engine of claim 8, wherein the historical rendering result is from ray tracing-based rendering.

15. A computer program product comprising instructions stored on a non-transitory computer-readable medium that, when executed by one or more processors, cause an electronic device to:

determine, in a first process of rendering a current frame of an application, a target mesh corresponding to a pixel in a current viewplane, wherein the application comprises at least one model, and wherein each model comprises a plurality of meshes;

obtain a historical rendering result of the target mesh that is from a second process of rendering a historical frame of the application, wherein the historical rendering result comprises a color of emergent rays of the target mesh; and use the historical rendering result to calculate, based on a threshold and a sample quantity corresponding to the historical rendering result, a first current rendering result of the pixel.

16. The computer program product of claim 15, wherein the current viewplane is from a first application, and wherein the historical rendering result is from a second application.

17. The computer program product of claim 15, wherein the historical rendering result and the current viewplane are from one application.

18. The computer program product of claim 15, wherein the instructions, when executed by the one or more processors, further cause the electronic device to:

determine that a that the sample quantity corresponding to the historical rendering result is greater than-a-than the threshold; and further calculate the first current rendering result by using the historical rendering result as a second current rendering result of the target mesh, and wherein the second current rendering result is for calculating the first current rendering result.

19. The computer program product of claim 15, wherein the instructions, when executed by the one or more processors, further cause the electronic device to:

determine that the sample quantity corresponding to the historical rendering result is not greater than the threshold; and further calculate the first current rendering result by:

performing ray tracing-based rendering on the target mesh to obtain an intermediate rendering result of the target mesh;

calculating, based on the intermediate rendering result and the historical rendering result, a second current rendering result of the target mesh; and calculating, based on the second current rendering result, the first current rendering result.

20. The computer program product of claim 19, wherein the instructions, when executed by the one or more processors, further cause the electronic device to store the second current rendering result.

* * * * *